US012780642B2

(12) United States Patent
Rupp

(10) Patent No.: US 12,780,642 B2
(45) Date of Patent: Nov. 3, 2026

(54) FLUID DISPENSER ASSEMBLY FOR USE WITH AN EDIFICE

(71) Applicant: Snowie LLC, Salt Lake City, UT (US)

(72) Inventor: Carl A Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 165 days.

(21) Appl. No.: 18/751,980

(22) Filed: Jun. 24, 2024

(65) Prior Publication Data

US 2025/0388450 A1 Dec. 25, 2025

(51) Int. Cl.
*B67D 1/08* (2006.01)
*B60P 3/025* (2006.01)

(52) U.S. Cl.
CPC .......... *B67D 1/0889* (2013.01); *B60P 3/0257* (2013.01)

(58) Field of Classification Search
CPC .............................. B67D 1/0889; B60P 3/0257
See application file for complete search history.

(56) References Cited

U.S. PATENT DOCUMENTS 5,921,445 A * 7/1999 Schmitz .................... B67D 1/02 222/626
12,098,067 B2 * 9/2024 Timmermans ........ B67D 1/1281
2006/0124664 A1 * 6/2006 Spears ................. B67D 1/1405 222/108
2008/0179346 A1 * 7/2008 Downey .................. A23G 9/28 62/342
2009/0078724 A1 * 3/2009 Lamb .................... B60P 3/0257 222/113
2010/0242497 A1 9/2010 Bertone
2011/0017776 A1 1/2011 Metropulos et al.
2012/0199616 A1 8/2012 Lamb et al.
2014/0027471 A1 * 1/2014 Tollefson .............. B60P 3/0257 296/22
2019/0045808 A1 2/2019 Rupp et al.
2021/0354971 A1 11/2021 Peirsman et al.
2022/0408753 A1 * 12/2022 Rupp ...................... A23G 9/245
2025/0388450 A1 * 12/2025 Rupp .................... B67D 1/0889

OTHER PUBLICATIONS

International Search Report and the Written Opinion of the International Searching Authority, Sep. 15, 2025.

* cited by examiner

*Primary Examiner* — Bob Zadeh
(74) *Attorney, Agent, or Firm* — TechLaw Ventures, PLLC; Terrence J. Edwards

(57) ABSTRACT

Fluid dispensers for use in connection with an edifice such as a vehicle, kiosk, or building. A system includes a mounting arm configured to be attached to an edifice. The system includes a fluid dispenser mounted to the mounting arm, wherein the fluid dispenser includes a mounting assembly, a plurality of faucets attached to the mounting assembly, and a plurality of tubes, wherein each of the plurality of tubes is in fluid communication with one or more of the plurality of faucets. Each of the plurality of tubes is disposed within a hollow interior space defined by the mounting arm, and each of the plurality of tubes is configured to provide fluid communication between the one or more of the plurality of faucets and a reservoir disposed within or mounted to the edifice.

20 Claims, 14 Drawing Sheets

FLUID DISPENSER ASSEMBLY FOR USE WITH AN EDIFICE

TECHNICAL FIELD

The present disclosure relates generally to fluid dispensing assemblies, and more particularly to fluid dispensing assemblies for attachment to an edifice.

BACKGROUND

The disclosure relates generally to edifices and vehicles for use in preparing, dispensing, and topping shaved ice or snow cone confectioneries, and more particularly, but not necessarily entirely, to a mobile edifice for use in providing shaved ice or snow cones prepared by a machine for that purpose and a topping dispenser for topping and flavoring shaved ice or snow cone confectionaries.

A variety of machines have been developed, described, and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups. Dispensing the syrups as toppings to a usually unflavored ice product can be time consuming for workers. Additionally, most customers desire various levels or amounts of toppings or flavoring syrups. Thus, it is advantageous to make topping dispensers available for customer use such that a customer can flavor the base ice product themselves.

In some instances, a user may desire to sell frozen confections at events such as sporting events. During these events there may be limited periods, such as a halftime, where potential customers may desire a snack. Traditional frozen confection vendors will sell and prepare frozen confections from the same stall or kiosk or window of a truck, which may result in long lines as customers wait for an attendant to both process their purchase and prepare their snack. By deploying flavoring dispensers away from the position of the sale, a user may process a customer's purchase of a frozen confection and allow the customer to prepare their own flavoring in another location, thus allowing for shorter lines and quicker service. Disclosed herein are systems and methods for deploying topping and other flavor dispensing mechanisms away from a point of sale to facilitate customer self-service.

Specifically described herein are systems, methods, and devices for fluid dispensing assemblies to be attached to an edifice such as a building, kiosk, vehicle, and so forth. The systems, methods, and devices described herein provide improved means for efficiently dispensing multiple different flavoring fluids for use in connection with frozen confections.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
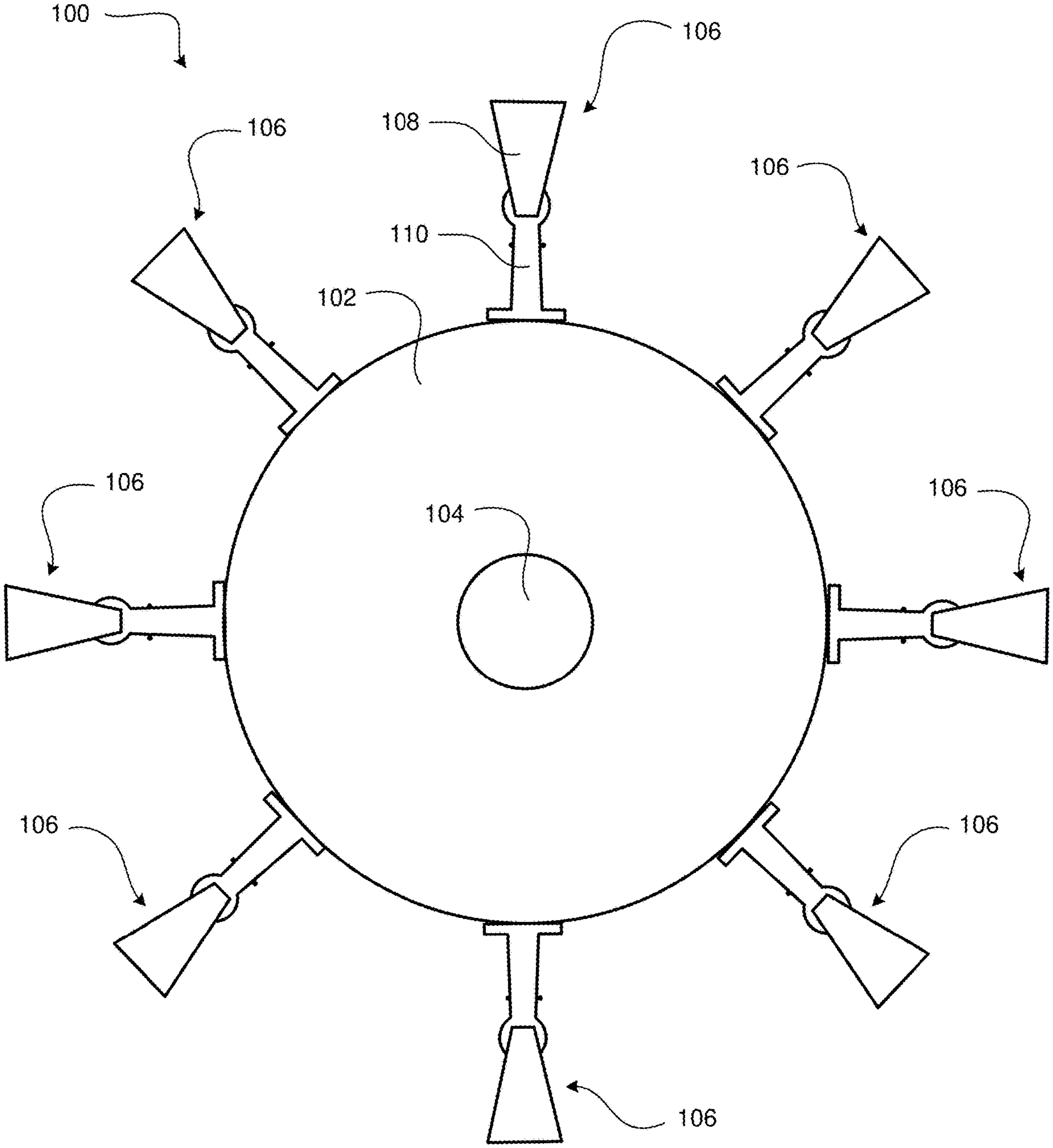
FIG. 1 is a schematic illustration of a top-down aerial view of a fluid dispenser.

Described herein are systems, methods, and devices for dispensing fluids. The systems, methods, and devices described herein may particularly be utilized to efficiently dispense multiple different fluid flavors for use in connection with frozen confections, such as shaved ice or a snow cone product. The fluid dispensing assemblies described herein are designed to be attached to an edifice such as, for example, a vehicle, kiosk, building, or other edifice for use in preparing or providing frozen confections.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems, and devices for producing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "shaved ice" and/or "snow cone" refer broadly to the large family of ice-based desserts or confections made from the fine shavings of ice or finely crushed ice. It will be appreciated that shaved ice and/or snow cones may often include a flavoring that may be a syrup or other sweetened condiment that is added to the shaved ice or snow cone. Similarly, the terms "ice shaving" or "snow cone" in reference to a machine are intended broadly to include all machines used to make or produce the large family of ice-based desserts or confections that may be classified as shaved ice or snow cone products.

As used herein, the term "edifice" is used to refer broadly to structures that generally form a boundary from which other structures can be attached and from which to provide frozen confections. An edifice may be its own stand-alone structure or may be part of another structure.

Referring now to the figures, FIG. 1 is a schematic illustration of a top-down aerial view of a fluid dispenser 100. The fluid dispenser 100 may be configured for use in connection with an edifice for efficiently serving and dispensing multiple different fluid flavors for use in connection with frozen confections such as shaved ice or snow cones. The fluid dispenser 100 may be removably attached to an edifice such as a vehicle, kiosk, or building, such that the fluid dispenser 100 is readily available for customer use at a location wherein frozen confections are prepared and served.

The fluid dispenser 100 includes a mounting assembly 102, which may include a circular geometry as shown in FIG. 1. The mounting assembly 102 may include alternative polygonal geometries, such as a triangular, quadrilateral, pentagonal, hexagonal, heptagonal, octagonal, nonagonal, or decagonal geometry, or other geometry not specifically described herein. The fluid dispenser 100 includes a plurality of faucets 106. In the example implementation illustrated in FIG. 1, the fluid dispenser includes eight faucets 106. Each of the plurality of faucets 106 includes a handle 108 and a spout 110. The fluid dispenser 100 additionally includes a mounting hole 104. In the implementation illustrated in FIG. 1, the mounting hole 104 matches the geometry of the mounting assembly 102 (i.e., a circular geometry) and is disposed within a center of the mounting assembly 102. The mounting hole 104 is utilized to removably secure the fluid dispenser to an edifice such as a vehicle, kiosk, building, or other structure.

In an example use-case, the fluid dispenser 100 is utilized to efficiently distribute a plurality of different syrup flavors for use in connection with a frozen confection such as shaved ice or a snow cone. Each of the faucets 106 is in fluid communication with a syrup reservoir, and the plurality of faucets 106 may be in fluid communication with different syrup reservoirs, such that the various faucets 106 are utilized to distribute different syrup flavors.

Figure 2:
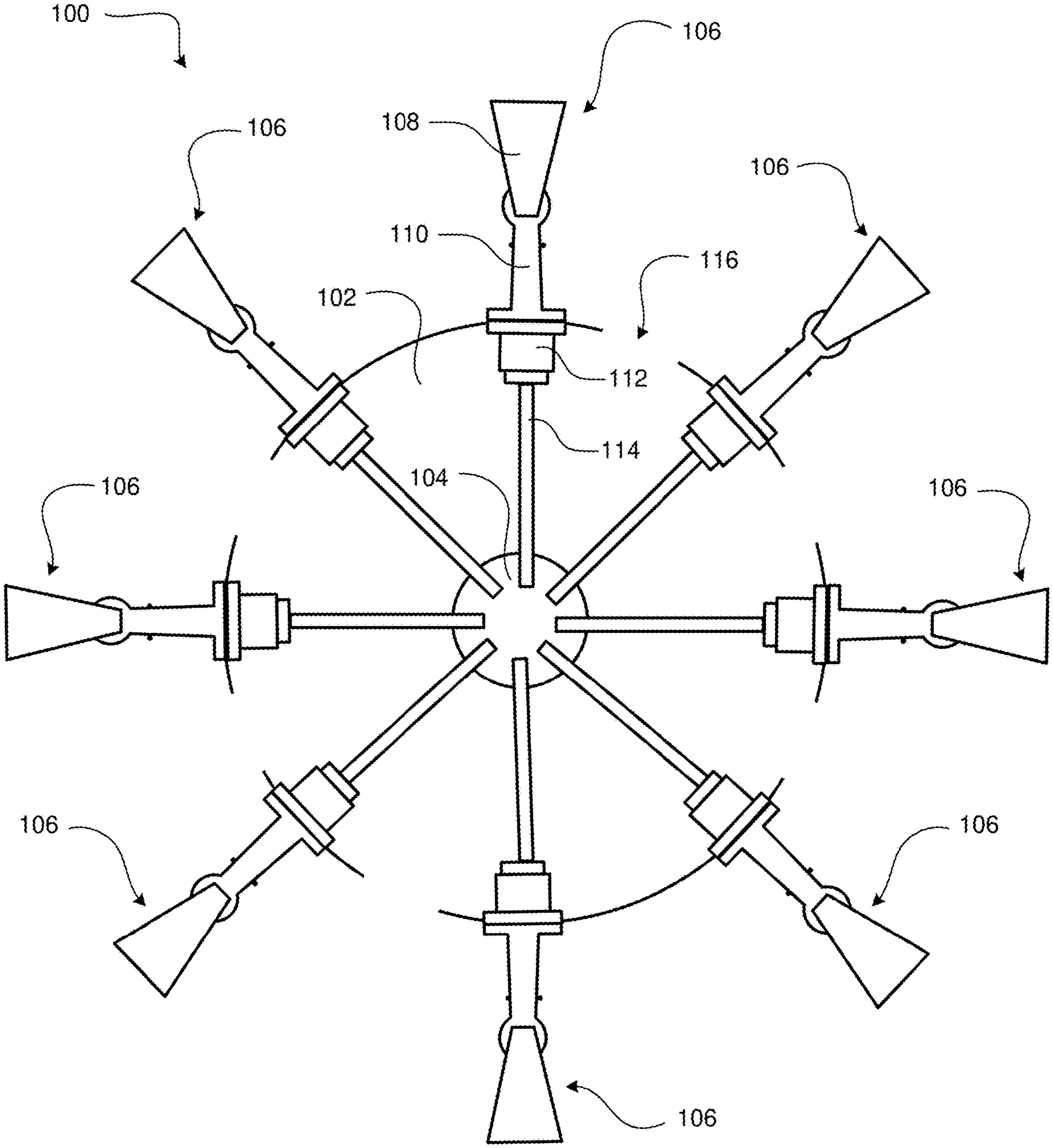
FIG. 2 is a schematic illustration of a cross-sectional top-down aerial view of a fluid dispenser.

FIG. 2 is a cross-sectional top-down aerial view of the fluid dispenser 100. In the cross-sectional view illustrated in FIG. 2, the faucet mounting assembly 112 for each faucet is visible. As shown in FIG. 2, the faucet mounting assemblies 112 are disposed within an interior space defined by the mounting assembly 102 of the fluid dispenser 100. Further illustrated in the cross-sectional view are the tubes 114 in communication with each faucet 106.

The fluid dispenser 100 includes at least one tube 114 in fluid communication with each faucet 106. Each of the tubes 114 runs from its respective faucet 106 into a middle portion of the mounting assembly 102, and then through the mounting hole 104. Each of the tubes 114 may then run into a reservoir comprising a fluid to be dispensed through the corresponding faucet 106.

Figure 3:
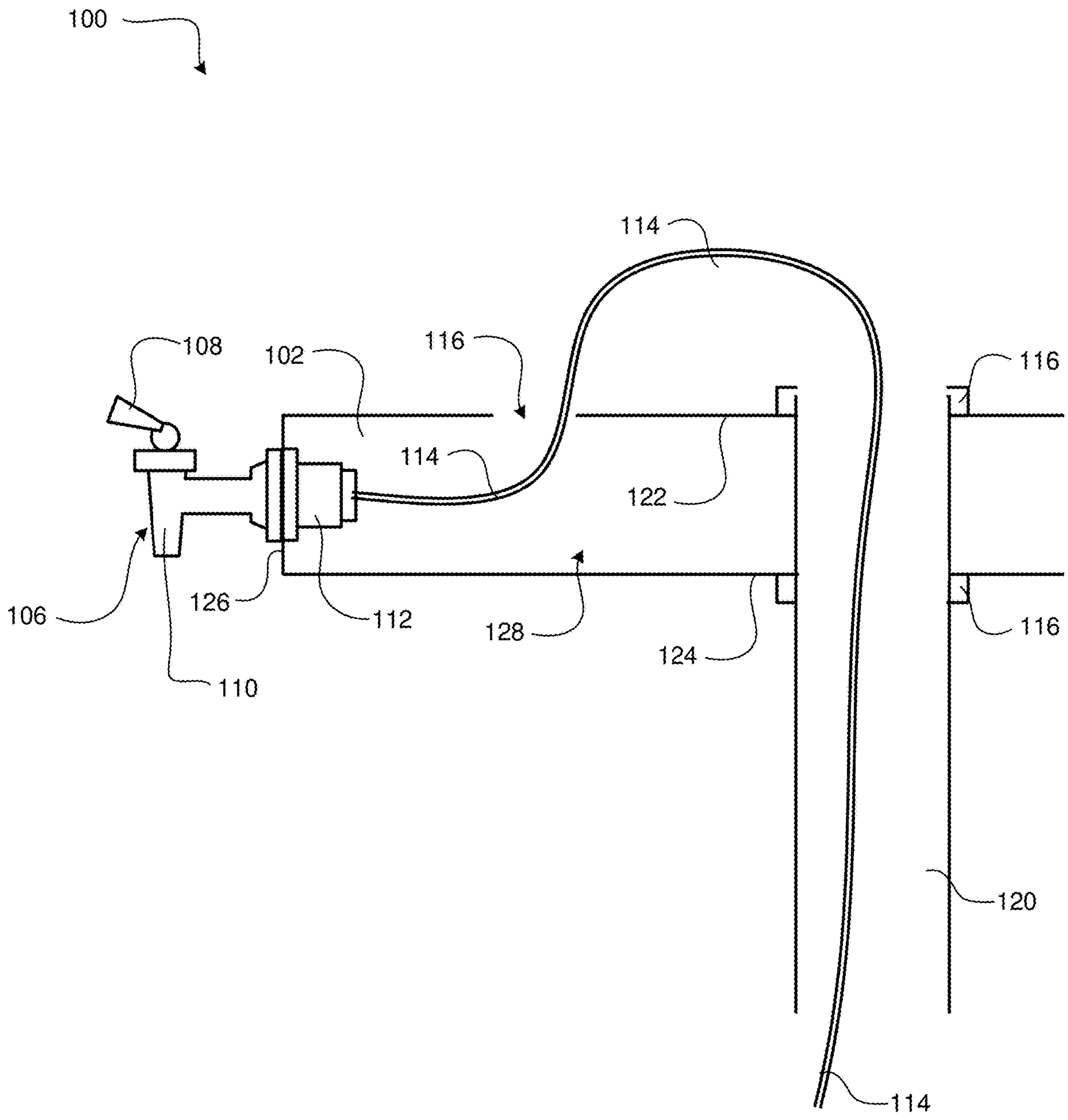
FIG. 3 is a schematic illustration of a cross-sectional side view of a fluid dispenser.

FIG. 3 is a cross-sectional side view of the fluid dispenser 100. As shown in FIG. 3, the mounting assembly 102 may include a hollow interior 128 defined by an upper wall 122, a lower wall 124, and a sidewall 126. The sidewall 126 defines a perimeter of the mounting assembly 102, and thus, the geometry of the sidewall 126 will be defined by the geometry of the mounting assembly 102. As shown in FIG. 3, the faucet 106 is removably secured to the mounting assembly 102 at the sidewall 126. The spout 110 includes one or more fastening components that interface with one or more fastening components of the faucet mounting assembly 112. When the corresponding fastening components interface with one another, the faucet 106 may be securely mounted to the mounting assembly 102 at the sidewall 126.

Further as shown in FIG. 3, the upper wall 122 of the mounting assembly 102 may include one or more tube holes 116 disposed therethrough. The tube holes 116 provide a space for feeding the tube 114 up and out of the mounting assembly 102. This may provide additional space for the plurality of tubes 114 and provide a means to prevent the tube 114 from kinking or otherwise preventing the flow of fluid therethrough. After the tube 114 is fed up through the tube hole 116, the tube 114 may then be fed down into a tube chute 120. The tube chute 120 is attached to the mounting assembly 102 at the mounting hole (see 104 first illustrated in FIG. 1). The mounting chute 120 is secured to the mounting assembly 102 with a fastening assembly, which may specifically include a setscrew 116 that is threaded through the mounting hole 104.

The tubes 114 are fed through the tube chute 120 and may eventually be disposed within vessels for holding various fluids. In some cases, each tube 114 is disposed within a different fluid vessel. In some cases, each fluid vessel holds a flavoring syrup of a different flavor, such that the fluid dispenser 100 may be utilized to simultaneously dispense a plurality of different flavor syrups for use on a frozen confection such as a snow cone or shaved ice.

Figure 4:
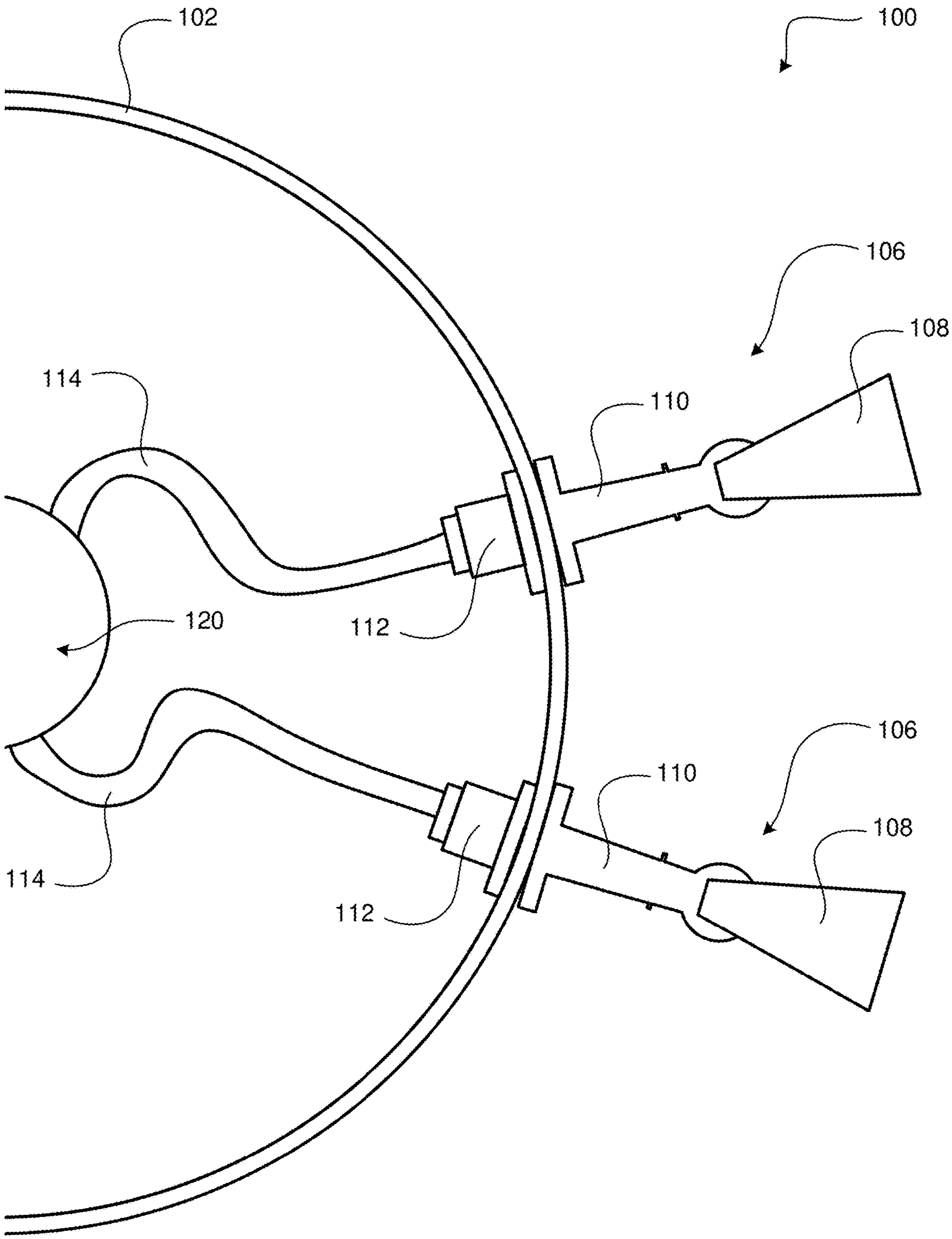
FIG. 4 is a schematic illustration of a cross-sectional top-down aerial view of a portion of a fluid dispenser.

FIG. 4 is a cross-sectional top-down aerial view of a portion of a fluid dispenser 100. As described herein, the fluid dispenser 100 may include any suitable number of faucets 106. The fluid dispenser 100 could specifically include two faucets 106 as shown in FIG. 4 and could include additional faucets 106 that are spaced apart from one another an equivalent distance or are spaced apart from one another at varying distances.

Figure 5:
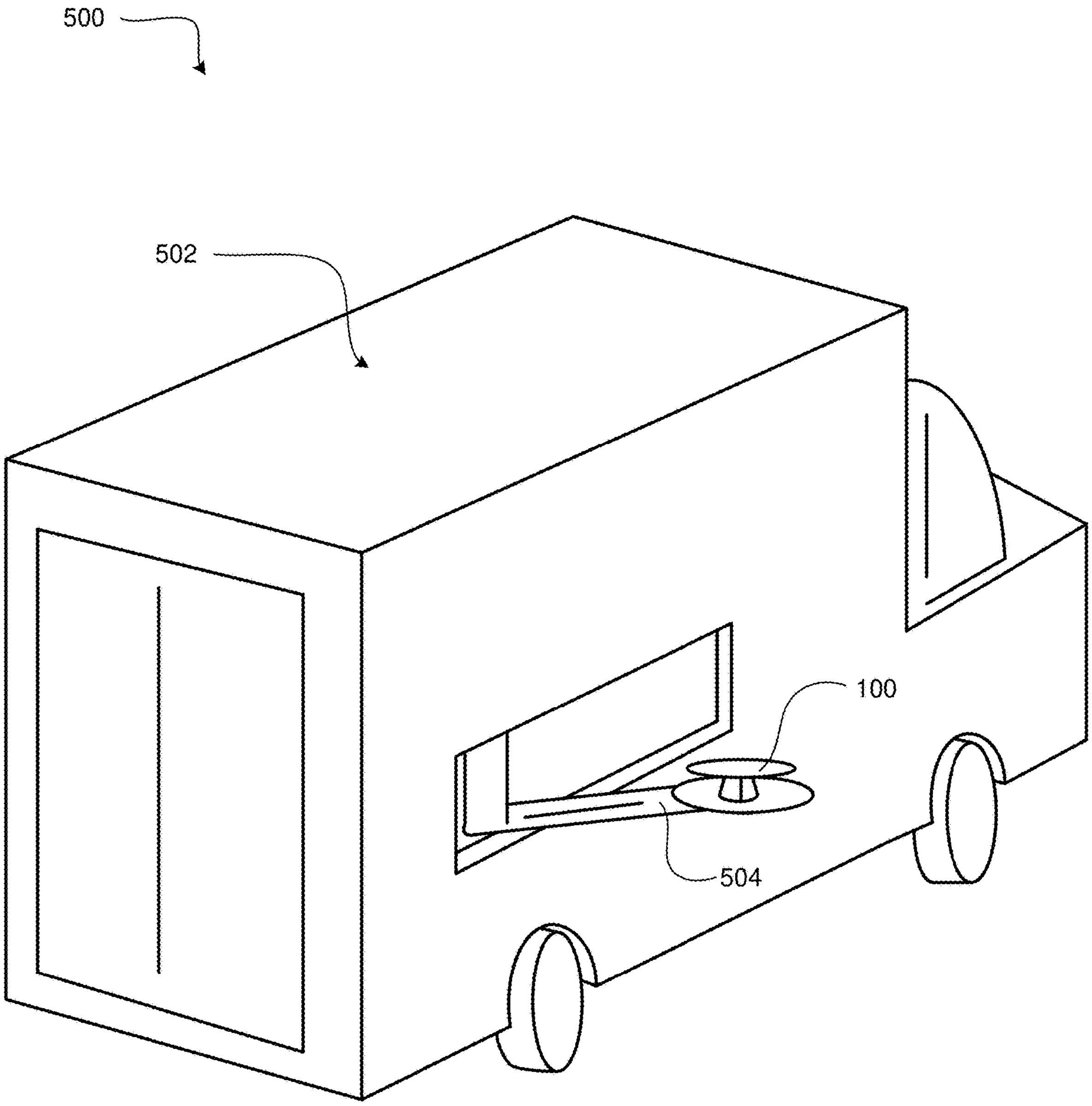
FIG. 5 is a schematic illustration of an edifice equipped with a fluid dispenser, wherein the fluid dispenser is accessible by way of a mounting arm assembly.

FIG. 5 is a schematic illustration of a perspective view of a system 500 for dispensing fluids from an edifice. The system 500 includes the fluid dispenser 100 and additionally includes an edifice 502. The edifice 502 may include a vehicle as shown in the example illustration of FIG. 5, and could alternatively include, for example, a kiosk, building, or other structure. The edifice 502 is equipped with a mounting arm 504 that supports the fluid dispenser 100 and enables a user to pull the fluid dispenser 100 out for use, and then store the fluid dispenser 100 within a cavity disposed within the edifice 502.

The fluid dispenser 100 may be mounted or otherwise attached to edifice 502 via a mounting arm 504. The mounting arm 504 may be joined to the edifice 502 and may freely pivot about an axis in some implementations, while in other implementations, the mounting arm 504 may be fixed to the edifice 502. The mounting arm 504 may be mounted to a sidewall of an edifice 502, to a roof, to a front or rear, or anywhere suitable at some point on an edifice 502. The sidewall may comprise a wall of the edifice, a shelf, a stand, a door, or a similar construct suitable for mounting a mounting arm thereto, depending on the implementation. The fluid dispenser 100 may be mounted to a distal end of the mounting arm 504 in some implementations, while in others one or more dispenser assemblies may be positioned at various positions along the length of the mounting arm 504. In some implementations, more than one arm 504 may be mounted to the edifice 502. In such cases, these mounting arms may be mounted at roughly the same point together or each may be independently mounted to separate positions on an edifice 502.

It should be noted that while FIG. 5 shows the edifice 502 implemented as a truck, the present disclosure is not limited to trucks or vans. An edifice 502 may be a different sort of structure depending on the implementation. In some implementations, an edifice 502 may be a wheeled cart or kiosk. In other implementations, an edifice 502 may be a stand. In yet other implementations, the edifice 502 may be any sort of structure that may be deployed in an area where one may sell frozen confections or similar treats upon which a mounting arm 504 could be mounted are within the scope of this disclosure.

Figure 6:
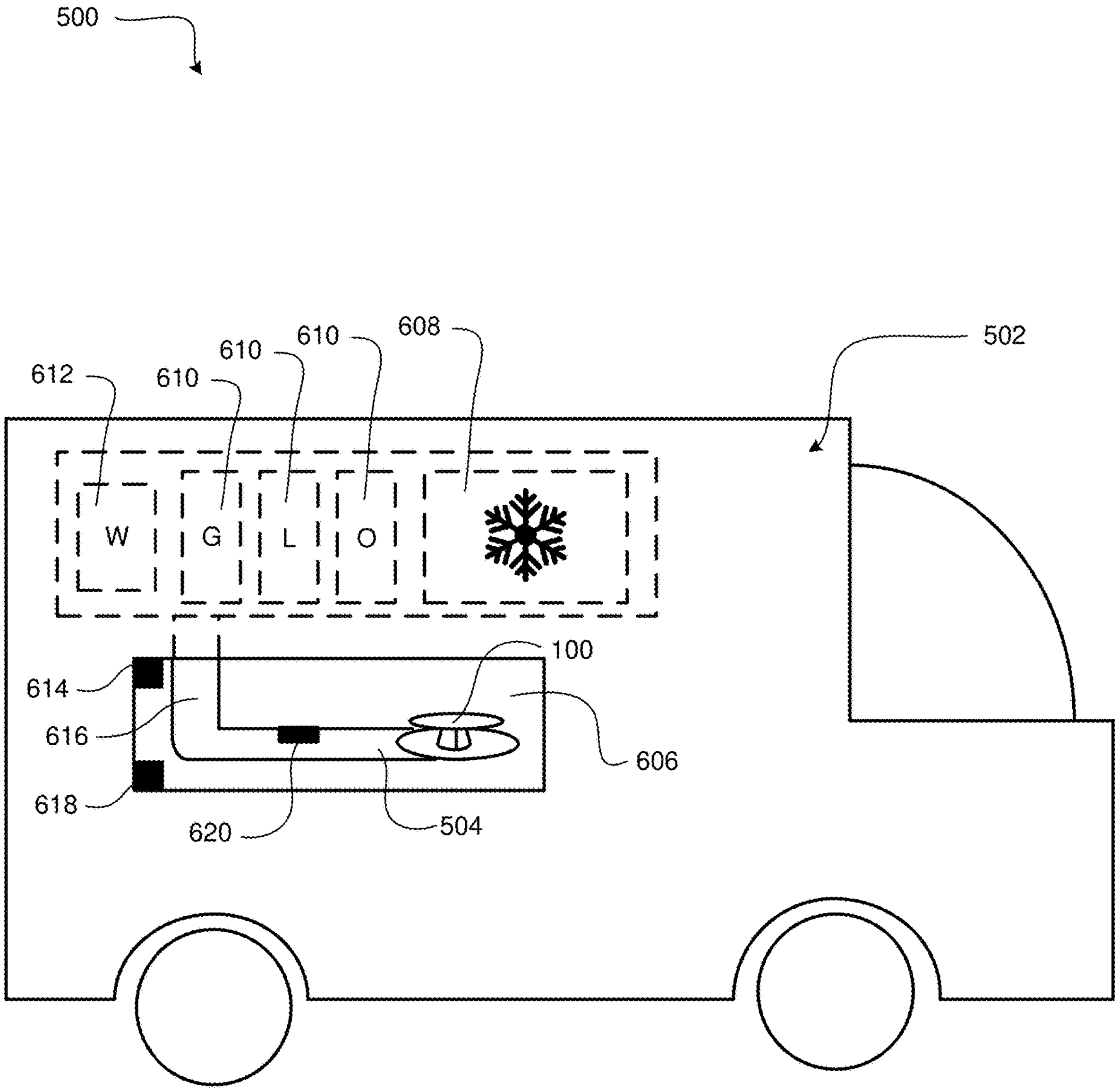
FIG. 6 is a schematic illustration of an edifice equipped with a fluid dispenser, wherein the fluid dispenser is accessible by way of a mounting arm assembly.

FIG. 6 is a schematic illustration of a side view of a system having edifice 502 having a fluid dispenser 100 mounted to a mounting arm 504 and disposed within an edifice recess 606. Within the edifice 502 there may be a coolant provider 608 and one or more of primary reservoirs 610. The coolant provider 608 may comprise a tank containing a type of liquid or gaseous coolant. The coolant may be routed via separate tubing to the primary reservoirs 610, through the mounting arm 504 to the fluid dispenser 100, or to both simultaneously. The coolant tubing (not shown) may interact with tubing from the primary reservoirs 610 to cool and maintain the temperature of the flavoring. The primary reservoirs 610 may comprise tanks, bags, or other suitable container structure containing one or more flavors, which may be a liquid or may in some instances be a solid, to be dispensed from the fluid dispenser 100. The tubing (see 114 first illustrated in FIG. 2) may originate from these primary reservoirs 610 and run along a length of, and sometimes through an interior of, a mounting arm 504 before terminating at the fluid dispenser 100. The primary reservoirs 610 shown in FIG. 6 may contain a variety of different flavored syrups. In the figure, the primary reservoirs 610 are shown with exemplary labels "G" for grape, "L" for lemon, and "O" for orange. These labels are for purpose of example and are not intended to be limiting. In other implementations any number of flavor syrups, individually or in combination, may be contained within the primary reservoirs 610 and dispensed from the fluid dispenser 100. In some implementations instead of or in addition to flavor syrups, primary reservoirs 610 may contain water, juice, sodas, or other similar types of fluids.

The edifice 502 may be a truck or van or another vehicle. While a truck is shown in the figure as an example it is not necessary for the edifice 502 to be a motorized vehicle. The present disclosure may also extend to carts, wagons, hand trucks, or other such vehicles to which a fluid dispenser 100 and arm 504 may be mounted. The present disclosure may additionally extend to kiosks, stands, or other standing structures that could be transported by truck from one location to another. The arm may be disposed within an edifice recess 606. The recess 606 may comprise an opening extending into the interior of the edifice 502 or may have one or more back and sidewalls defining the recess as a cavity within a sidewall of the edifice 502. Within the recess 606 may be a number of mechanisms, such as a locking mechanism 618, a deployment mechanism 614, or both. The locking mechanism 618 may comprise a button, lever, or comparable means to facilitate locking the mounting arm 504 to a particular position. A mounting arm 504 may be fully disposed within the recess 606 in a stored position, as seen here in FIG. 6. The mounting arm 504 may also extend from the recess 606 away from the edifice 502 in a deployed position (as seen in FIG. 5). It will be appreciated that while reference is made to "horizontal" mounting arms and "vertical" mounting arms in this disclosure, a mounting arm 504 may not move in a perfectly horizontal or vertical way relative to the edifice 502. In some implementations, a mounting arm 504 may deploy at an angle relative to a sidewall of an edifice 502. The locking mechanism 618 may be utilized to lock the position of the mounting arm 504 in the stored position, the deployed position, or somewhere in between in a partially deployed position.

The mounting arm 504 may additionally feature a secondary dispenser 620. The secondary dispenser 620 may comprise a faucet, spigot, nozzle, a hole, or other mechanism configured to dispense a fluid from a source within the edifice 502. The source may be one of the primary reservoirs 610 or a secondary reservoir 612 independent from primary reservoirs 610. In some implementations secondary dispenser 620 may be in fluid communication with secondary reservoir 612 via tubing, labeled in FIG. 6 with a "W" to indicate water, as a non-limiting example, though any other fluid is intended to be within the scope of the present disclosure. In other implementations the secondary dispenser may dispense fluid from within the mounting arm 504, like, for example, water, from melted ice deposited into a chute within the edifice 502 (see FIG. 12). The secondary dispenser 620 may comprise a knob, handle, or other similar means that, when manipulated, permits the secondary dispenser 620 to dispense a fluid, depending on the source. In implementations where the secondary dispenser 620 is a hole, the fluid may continuously run or drip from secondary dispenser 620.

While FIG. 6 shows a single secondary dispenser 620 located centrally on arm 504, it will be appreciated that this disclosure is not limited to any number or positioning of secondary dispensers 620. Depending on the implementation, a mounting arm 504 may feature multiple secondary dispensers 620 located at various positions along a length of a mounting arm 504. In features utilizing multiple mounting arms 504, a user may have one or more secondary dispensers 620 on one or several of the multiple mounting arms 504 located at various positions along any of the mounting arms 504. In other implementations a user may forego a secondary dispenser 620 altogether.

It will be appreciated that while FIG. 6 shows primary reservoirs 610 as a grouping and secondary reservoir 612 as an individual container, the present disclosure is not limited to any particular number or configuration of reservoirs. Depending on the implementation a system according to the present disclosure may feature, for example, a sole primary reservoir for one purpose, a group of secondary dispensers for a secondary dispensers for another purpose, and one or more of a tertiary or onward dispenser for yet another purpose, according to the implementation and needs of a user.

The secondary dispenser 620 may allow a user to wash their hands or otherwise receive water in some implementations, while in other implementations a user may receive a different liquid they may use for another purpose. A mounting arm 504 according to the present disclosure may optionally feature such a faucet or spigot 620 and may have more than one faucet or spigot 620 depending on the implementation. FIG. 6 shows a secondary dispenser 620 mounted to a central position of mounting arm 504, but it will be appreciated that a secondary dispenser 620 may instead be located anywhere on mounting arm 504. In some implementations the secondary dispenser 620 may be located on or close to dispenser 100. In other implementations, secondary dispenser 620 may instead be located in another position on edifice 502 and may reside within its own edifice recess.

The mounting arm 504 may be mounted to the edifice 502 by a mount 616. The mount 616 may comprise a ball joint, a linkage, a hinge, or other similar mechanism that permits a user to mount the mounting arm 504 to the edifice 502 while retaining some degree of movement depending on the mount 616 utilized. The mount 616 may retain the mounting arm 504 in a way such that the mounting arm 504 may move between a closed position or open position. In some implementations the mount 616 may be mounted to a sidewall of the edifice, while in other implementations may be mounted to another structure, such as a rack or shelf which may itself be mounted to the edifice. A rack or shelf may or may not be utilized in a situation where a user may desire to use mount 616 to mount a mounting arm 504 to a roof or underside of an edifice 502. In other implementations a user may mount arm 504 via mount 616 to a roof or underside of an edifice 502 directly.

A closed position may be a positioning of arm 504 whereby the mounting arm 504 is maneuvered closer to a sidewall of the edifice 502 for, for example, storage purposes when the mounting arm 504 is not in use and/or while the edifice 502 is travelling or otherwise in motion. In some implementations the closed position may entail a mounting arm 504 positioned within a recess 606 as shown in FIG. 6. An open position may entail a positioning of arm 504 as shown later in FIG. 8. In such a position, a mounting arm may maneuver away from a sidewall of edifice 502. A user may maneuver a mounting arm 504 freely along an axis of movement depending on the type of mount 616 used.

For example, in an implementation where a mounting arm 504 is pivotably mounted a mounting arm 504 may rotate or pivot according to an axis provided by the mount 616. In other implementations a mount 616 may comprise a ball joint in which case a mounting arm 504 may be maneuvered according to the freedom of movement allotted by a ball joint. An open position may comprise a mounting arm 504 being maneuvered fully away from edifice 502 in some implementations, or in others an open position may comprise a mounting arm being maneuvered far enough away from a sidewall of edifice 502 such that a user may sufficiently access a fluid dispenser 100 mounted to a mounting arm 504. Those skilled in the art will appreciate that the precise boundaries of closed position and open position may vary according to the implementation, and that any positioning of arm 504 within its freedom of movement could comprise the open position while arm 504 is in use.

Figure 9:
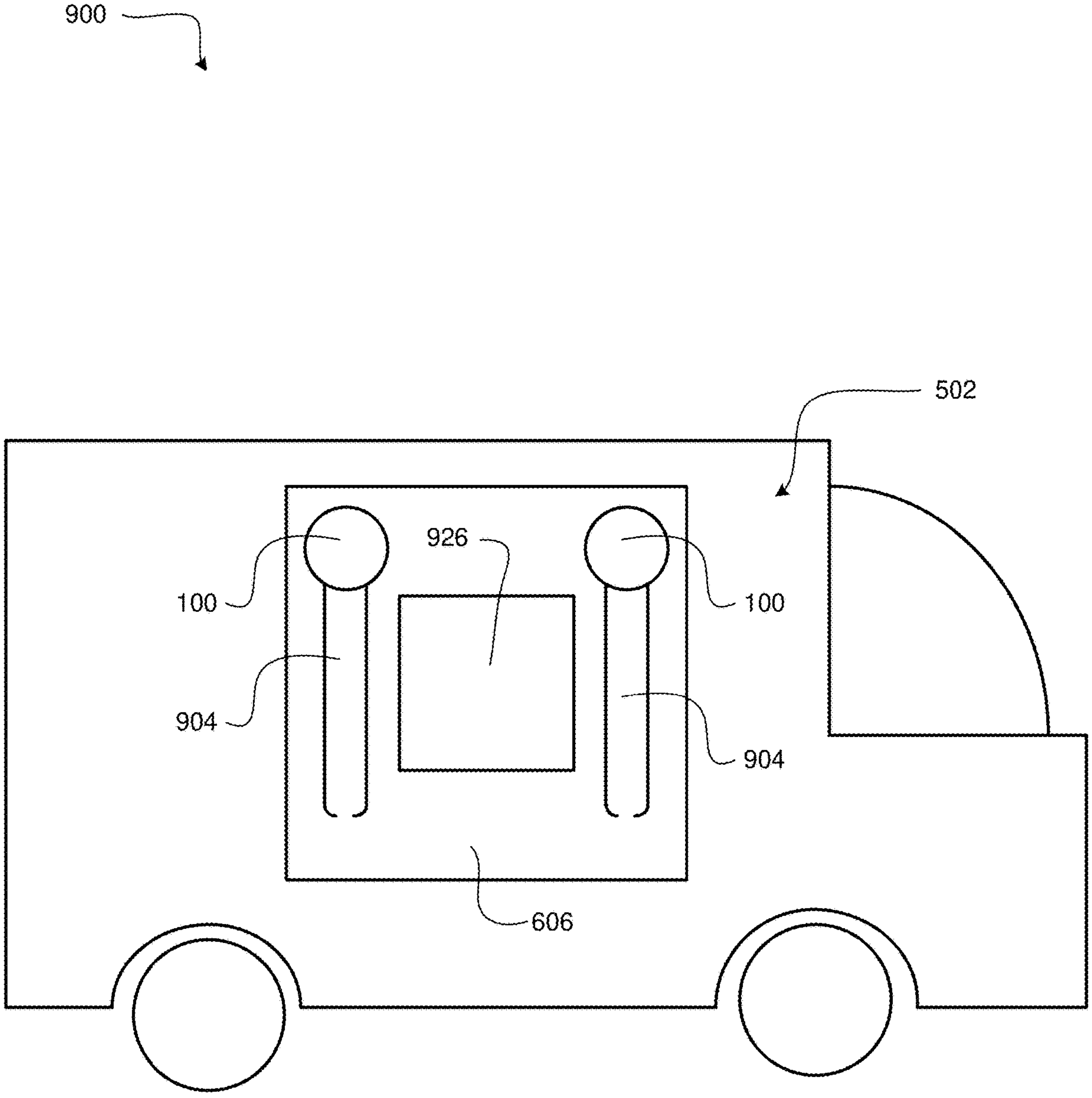
FIG. 9 is a schematic illustration of a side view of a mounting arm dispenser assembly mounted to a mobile edifice having two mounting arm dispenser assemblies that deploy vertically.

Depending on the implementation, one or more mounting arms 504 may be mounted to an edifice 502 using one or more mounts 616. In some implementations multiple mounting arms 504 may be mounted to edifice 502 by a single mount 616 or mount point as shown in FIG. 6. In other implementations multiple mounting arms 504 may be mounted individually by their own mounts 616, as shown in FIG. 9. Those skilled in the art will appreciate any number and combination of mounting arms 504 and mounts 616 that may be affixed to an edifice 502 are within the scope of this disclosure.

Figure 7:
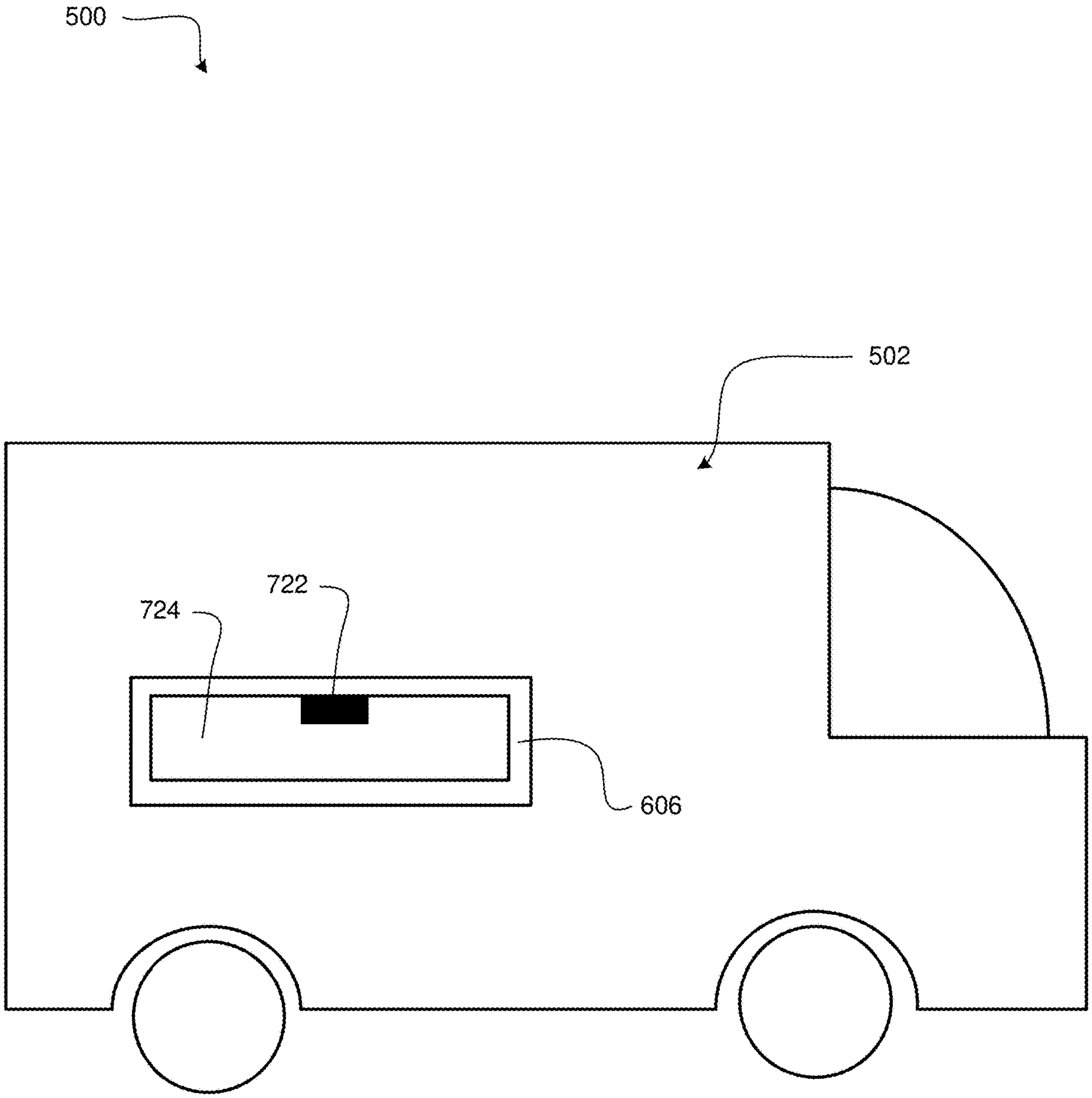
FIG. 7 is a schematic illustration of an edifice equipped with a fluid dispenser, wherein the fluid dispenser is disposed within a recess cut into a sidewall of the edifice.

The deployment mechanism 614 may be used to deploy the mounting arm 504 in some implementations, while in others the deployment mechanism 614 may be positioned outside of the recess 606 and used to open or close the hatch door seen in FIG. 7. The deployment mechanism may comprise a button or lever than when manipulated may open or close the hatch door, change the position of the mounting arm 504, or both. In some implementations a single deployment mechanism may, for example, open the hatch door and deploy the mounting arm 504 when manipulated, then store the mounting arm 504 and close the hatch door when manipulated again. In other implementations separate deployment mechanisms may exist, whereby one controls the hatch door and the other controls the mounting arm 504 position. The deployment mechanism 614 may employ a spring or a motor to operate the hatch door or the mounting arm 504. The deployment mechanism 614 may be in electrical communication with a motor in some implementations to facilitate motorized deployment between an open or closed position of a mounting arm 504. In other implementations the deployment mechanism 614 may be mechanical in nature and require a user to manually adjust a mounting arm 504 between an open and closed position. In yet other implementations the deployment mechanism 614 may comprise a lock, latch or similar mechanism separate from locking mechanism 618 that also secures a mounting arm 504 within the edifice recess 606. In some implementations deployment mechanism 614 may comprise both a lock, latch, or similar mechanism as well as a spring, motor, or other means for deploying one or more mounting arms 504. In some implementations deployment mechanism 614 may operate a hydraulic system which may deploy or return mounting arm 504 out to an open position or back to a closed position within an edifice recess 606.

FIG. 7 is a schematic illustration of a side view of the system 500 for dispensing fluids from an edifice 502 for serving frozen confections such as snow cones or shaved ice. The edifice 502 includes an edifice recess 606 and a panel 724. The panel 724 may be mounted to a sidewall of edifice 502. In some implementations edifice recess 606 may be located on a rear wall or a top or roof of edifice 502. In these implementations panel 724 is mounted to whatever wall of edifice 502 the recess 606 is positioned. The panel 724 may operate as a hatch and be pivotably mounted to the sidewall by one edge. The panel 724 may additionally have a latch 722 or comparable securing means to secure the panel to the sidewall. In some implementations the panel 724 may comprise a removable panel that completely detaches from the sidewall of the edifice 502 in order to expose the edifice recess 606 and the arm and dispenser assembly therein. In some implementations the door and/or mount point of the door may comprise a spring or motorized components to facilitate opening of the panel 724 via the deployment mechanism 614 seen in FIG. 6.

Figure 8:
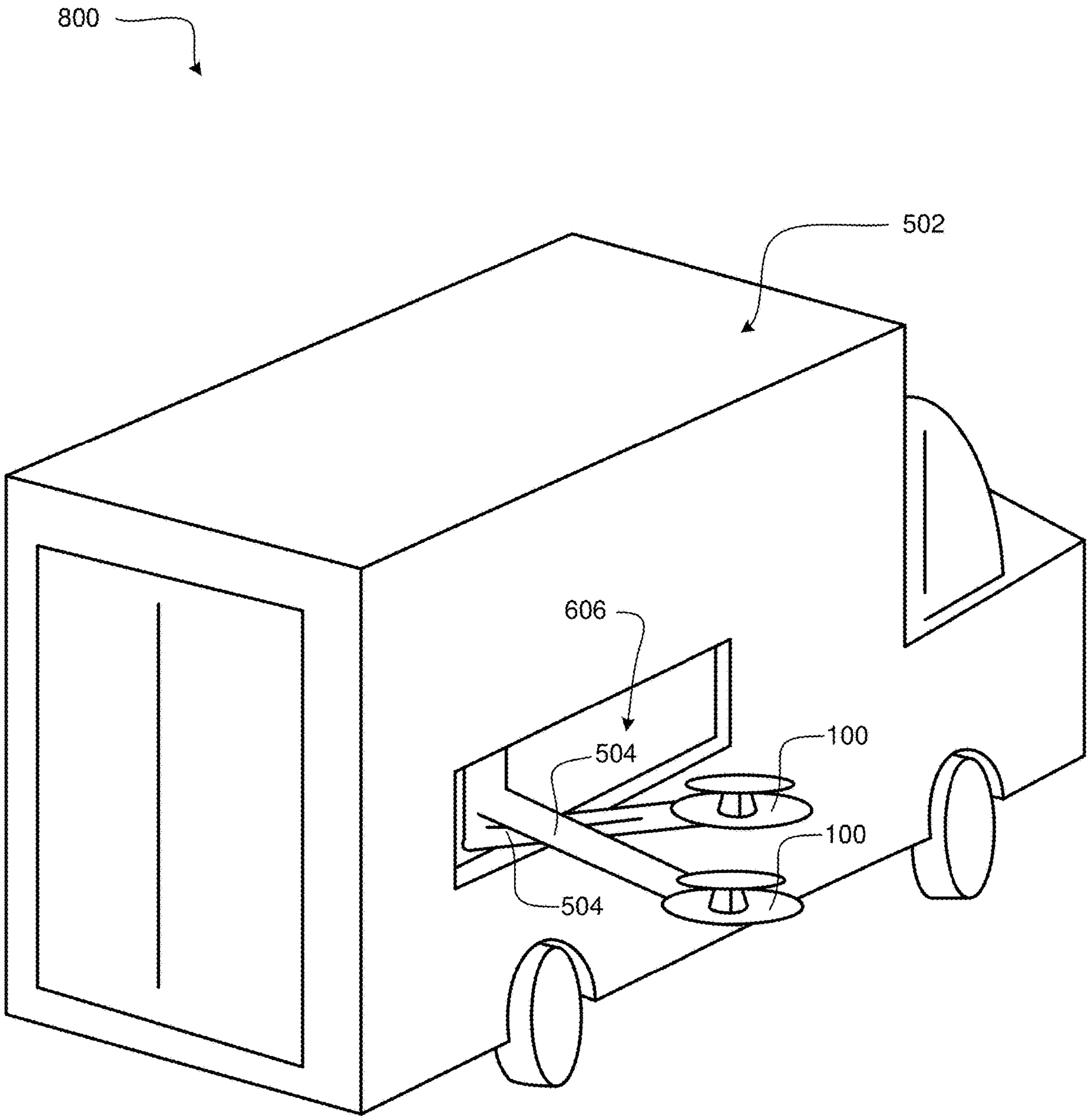
FIG. 8 is a schematic illustration of a perspective side view of a mounting arm dispenser assembly mounted to a mobile edifice having two deployed dispenser assemblies each attached via a mounting arm.

FIG. 8 is a schematic illustration of an implementation of a system 800 for dispensing fluids from an edifice 502. The system 800 illustrated in FIG. 8 includes similar components to the system 500 first illustrated in FIG. 5 but differs by including two independent mounting arms 504 mounted to the edifice 502 within the edifice recess 606.

In the system 800, each mounting arm 504 may be independently rotatable around an axis defined by the mounting point on the edifice 502. The coolant provider and primary reservoirs shown in FIG. 6 may each be separately routed through each of the mounting arms 504. In some implementations each arm may have a separate coolant provider and one or more primary reservoirs, such that some flavors may be accessible from one fluid dispenser 100 and some accessible from another. In some implementations a user may choose to maintain independent mounting arms 504 at different temperatures depending on the user's needs. Depending on the implementation, a user may elect to have the same flavors or assorted flavors travel through each mounting arm 504 present to each mounting arm 504's respective fluid dispenser 100. As a non-limiting example, a user may have first flavoring delivered through a first mounting arm and second flavoring delivered through a second mounting arm. In other implementations a user may have a first and second flavoring available through both the first mounting arm and the second mounting arm. In yet other implementations one mounting arm may be dedicated to its own non-flavoring fluid, such as water with which a user may receive a drink or wash their hands. In other implementations a user may have three or more mounting arms and may deliver individual, unique, combination, or any other configuration or organization of fluids through each mounting arm 504 to the fluid dispenser 100.

In various implementations the plurality of dispensers may be configured differently to attach to different portions and structures of the edifice. In an implementation a first dispenser may be configured to attach to a side surface of an edifice, while a second dispenser may be configured to fit over a window or door of the edifice. A second dispenser may comprise a linkage or may be statically attached to the edifice.

FIG. 9 is a schematic illustration of a system 900 for dispensing fluids, wherein a fluid dispenser is mounted to an edifice 502. The system 900 illustrates an implementation wherein a vertically-mounted mounting arm 904 is deployed vertically from the edifice 502. The mounting arms 904 of the system 900 illustrated in FIG. 9 may deploy by rotating away from the edifice 502 and down to a substantially horizontal "open" position. This differs from the horizontally-mounted mounting arm 504 (not shown in FIG. 9) that is first discussed in connection with FIG. 5.

It will be appreciated that while reference is made to "horizontal" mounting arms and "vertical" mounting arms, a mounting arm may not move in a perfectly horizontal (see 504) or vertical (see 904) direction relative to the edifice 502. In some implementations, a mounting arm 504 may deploy at an angle relative to a sidewall of an edifice 502. The mounting arms 504, 904 described herein may be connected to one overall bigger arm, or each mounting arm 504, 904 may be entirely separate as shown in FIG. 9.

Figure 10:
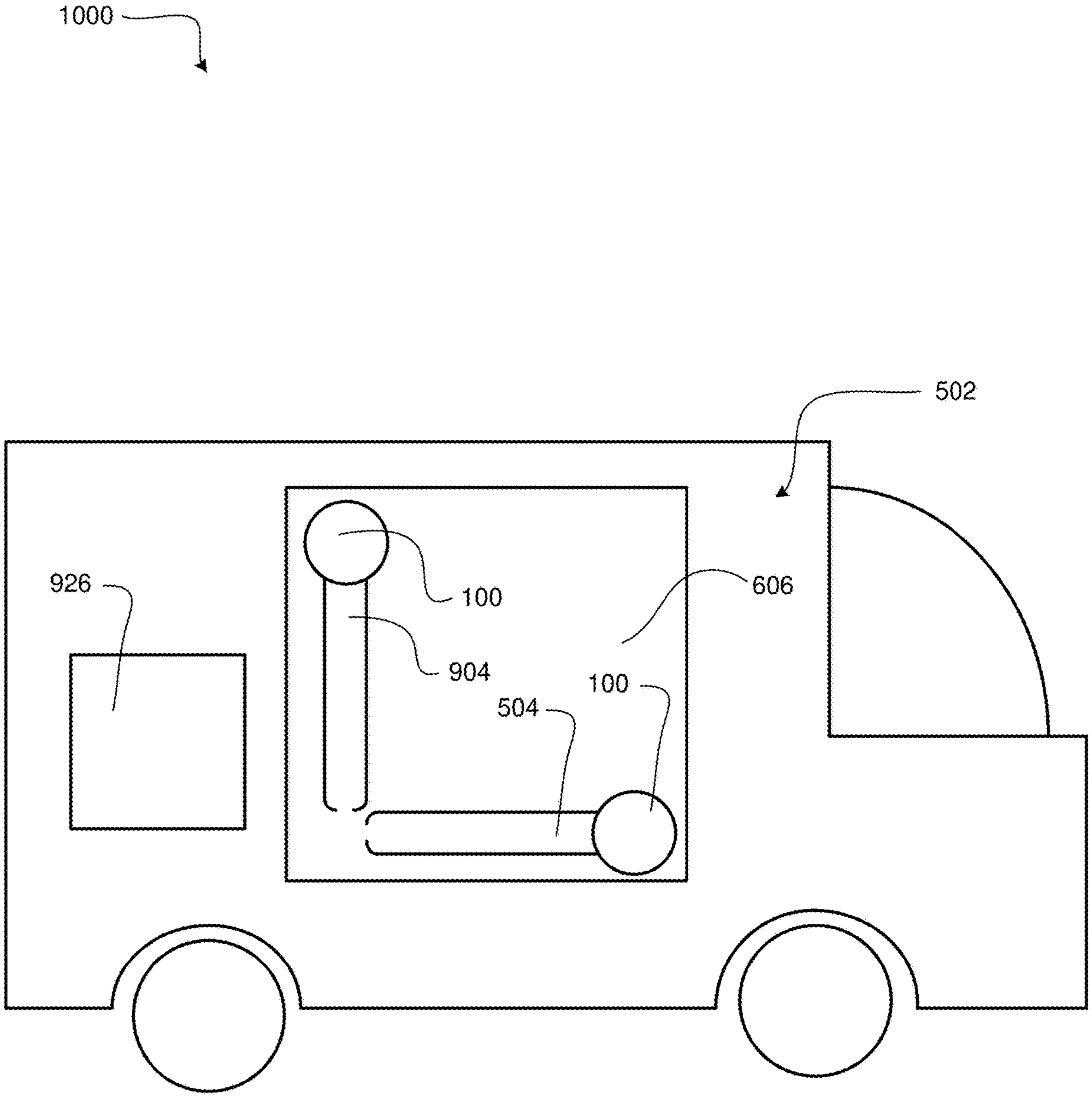
FIG. 10 is a schematic illustration of a side view of a mounting arm dispenser assembly mounted to an edifice having a horizontal mounting arm and a vertical mounting arm.

FIG. 10 is a schematic illustration of a system 1000 for dispensing fluids from an edifice that may be deployed to serve frozen confections such as snow cones or shaved ice. In the implementation illustrated in FIG. 10, the system 1000 includes a horizontally-mounted mounting arm 504 and additionally includes a vertically-mounted mounting arm 904.

In some implementations, the edifice 502 includes one or more horizontally-deployed mounting arms 504 (seen in, for example, FIG. 5) and one or more vertically-deployed mounting arms 904 in the same implementation, as shown in FIG. 9. Any number of mounting arms, horizontal or vertical, may be operated by at least one deployment mechanism or locking mechanism depending on the implementation. In some implementations, each mounting arm present may be operated by its own deployment and/or locking mechanisms. In other implementations, multiple mounting arms may be operated by one deployment mechanism or locking mechanism.

Additionally, the edifice recess 606 may have additional features within, such as a preparation station 926. The preparation station 926 is shown in FIG. 9 as a single unit, but those skilled in the art will appreciate one or more preparation stations 926 may be present depending on the implementation. The preparation station 926 may additionally be located anywhere on edifice 502 and is not limited to placement within a recess 606, as shown in FIG. 10. In some implementations, the preparation station 926 is detachable from edifice 502 and may be deployed as a standalone structure near edifice 502 or elsewhere. In some implementations, the preparation station 926 may be configured to dispense paper towels, napkins, wet wipes, or some other type of material to allow users to clean their hands, dry their hands, or otherwise receive a towel, napkin, wet wipe, or the like for any other reason. In some implementations, the preparation station 926 may be configured to dispense plastic or some other material cutlery, such as a fork or spoon. In yet other implementations the preparation station 926 may dispense additional cones or bowls to hold a frozen confection or similar confectionary item. In yet other implementations, one or more preparation stations 926 may be present and each may dispense one or more of some type of towel, cutlery, or additional confection containers.

While the preparation station 926 shown in FIG. 9 is shown in an implementation of edifice 502 featuring vertically-deploying mounting arms 504, it will be appreciated that one or more preparation stations 926 may be present in any implementation discussed herein. Additionally, while the preparation station 926 is shown within an edifice recess 606 in FIG. 9, it will be appreciated that one or more preparation stations 926 may be mounted anywhere on edifice 502 or deployed stand-alone and remotely next to edifice 502 in another type of storage or container.

Figure 11:
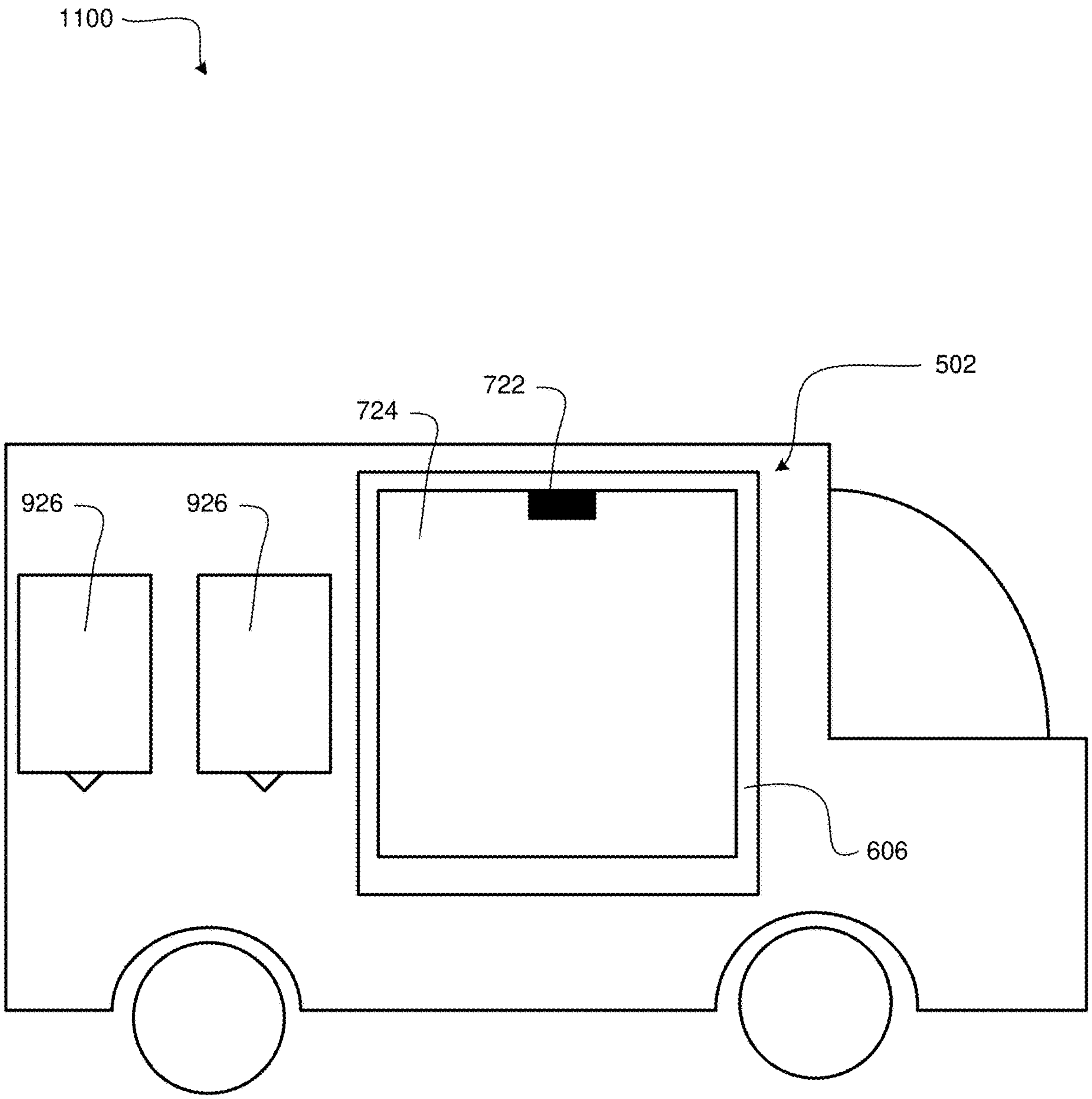
FIG. 11 is a schematic illustration of a side view of a mounting arm dispenser assembly mounted to an edifice having secondary topping dispensers.

FIG. 11 is a schematic illustration of a system 1100 for dispensing fluids from an edifice that may be deployed to serve frozen confections such as snow cones or shaved ice. The system 1000 includes an edifice 502 having secondary preparation stations 926. In addition to the mounting arm assemblies, the edifice 502 may additionally have one or more topping dispensers 1102 mounted to the edifice 502. These topping dispensers 1102 may contain additional toppings separate from the syrups, such as marshmallow, cream, marshmallow cream, merengue, peanut butter, jelly, lemonade, chocolate syrup, carbonated water, soda, or other similar type of topping. These topping dispensers 1102 may or may not be cooled, and in implementations where they are cooled the topping dispensers 1102 may be connected to the chute or coolant system described in FIG. 7 or 12, or some other type of heating or cooling means depending on the implementation. The topping dispensers 1102 may terminate in a spigot, faucet, or similar means to allow users to control the amount of topping dispensed. In the present figure the topping dispensers 1102 are shown mounted to a sidewall of the edifice on the same sidewall as the edifice panel 724 and edifice recess 606, however, it will be appreciated that the secondary dispensers may be freely mounted anywhere on the edifice, or even deployed in stand-alone stands or similar next to and remote from the edifice 502. In other implementations one or more topping dispensers 1102 may be located within an edifice recess 606 together with mounting arm dispenser assemblies or may be located within their own edifice recess depending on a user's needs.

Figure 12:
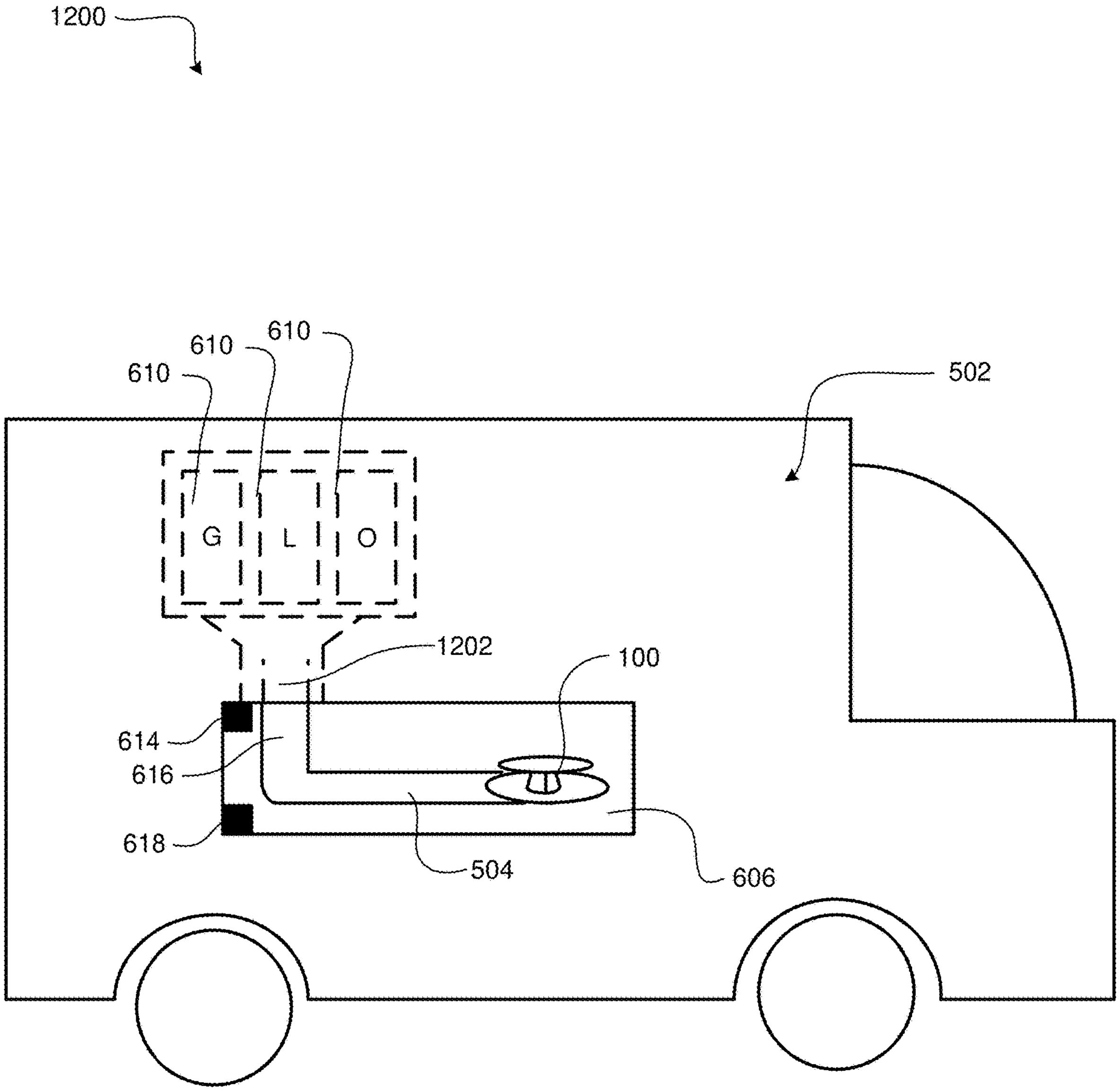
FIG. 12 is a schematic illustration of a side view of a mounting arm dispenser assembly mounted to an edifice having a cooling chute.

FIG. 12 is a schematic illustration of a system 1200 for dispensing fluids from an edifice that may be deployed to provide frozen confections such as snow cones or shaved ice. The system 1200 includes similar components to other systems described herein, and additionally includes a cooling chute 1202 integrated into the edifice 502. During frozen confection production, it is often the case that leftover ice accumulates. This leftover ice may be found in an ice container where the ice simply does not get used, or found in ice shaving machines after shaving ice, or found elsewhere for whatever reason. In addition to or separately from cooling solutions like those described in FIG. 6, a user may use the residual, leftover ice with the cooling chute 1202. A user may additionally use separately from or in addition to "fresh" ice such as, for example, bagged ice or block ice purchased from a store, or in some instances even snow off the ground. The cooling chute may comprise a body and an opening within the body, and that opening may permit a user to introduce ice to an interior of the body. The tubing from primary reservoirs 610 may feed through the cooling chute and out to a mounting arm 504 and come into contact with the ice fed through the chute 1202, thus chilling the tubing and the flavoring traveling therethrough. The ice in the cooling chute can thus be used to cool the flavoring within primary reservoirs 610 that travels through the tubing instead of or in addition to cooling solutions shown in FIG. 6.

Figure 13A:
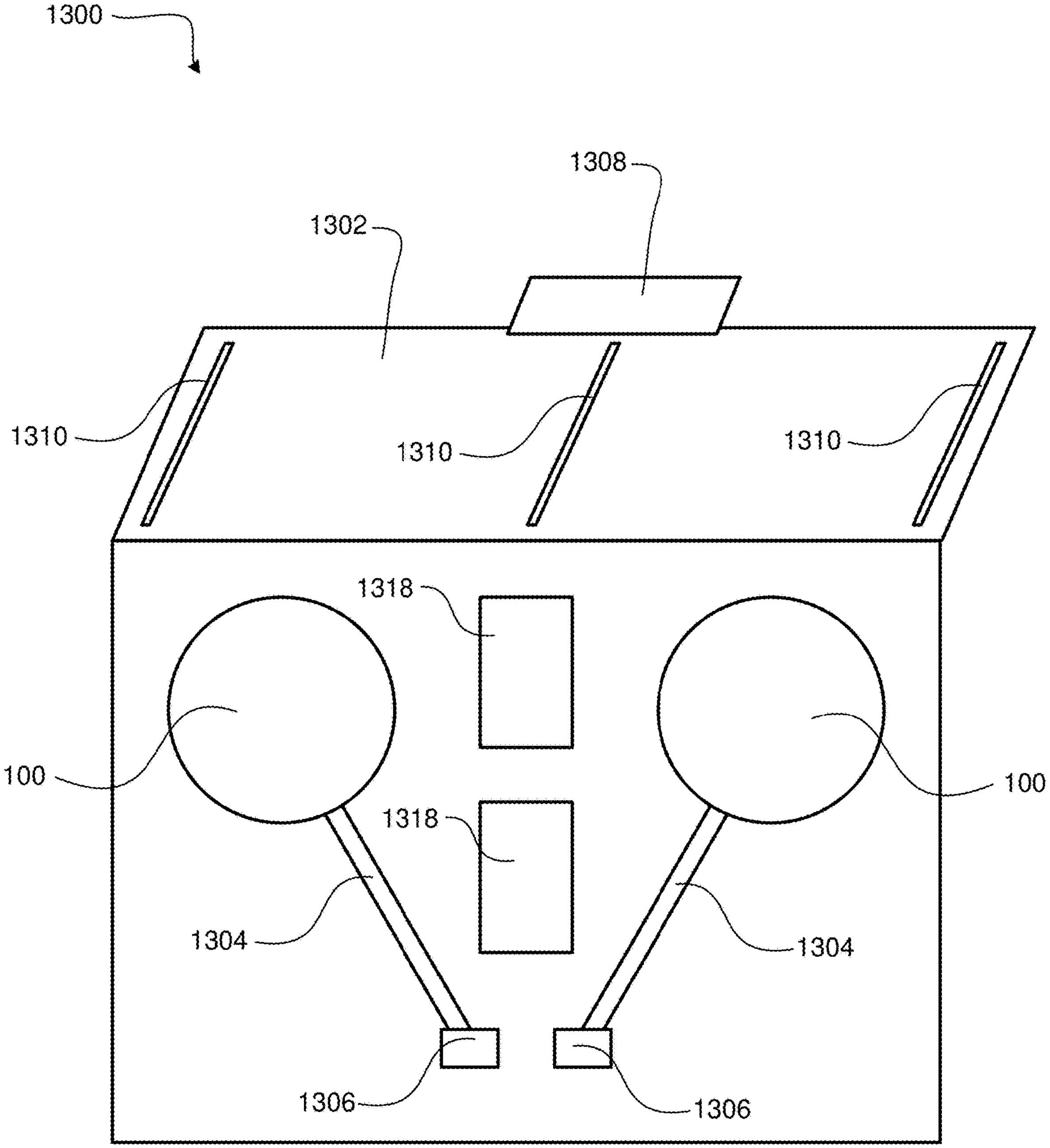
FIG. 13A is a schematic illustration of a side view of a portable preparation assembly, wherein the portable preparation assembly is configured to be disposed within a recess defined within a sidewall of an edifice, and wherein the portable preparation assembly is in the closed or stored orientation.
Figure 13B:
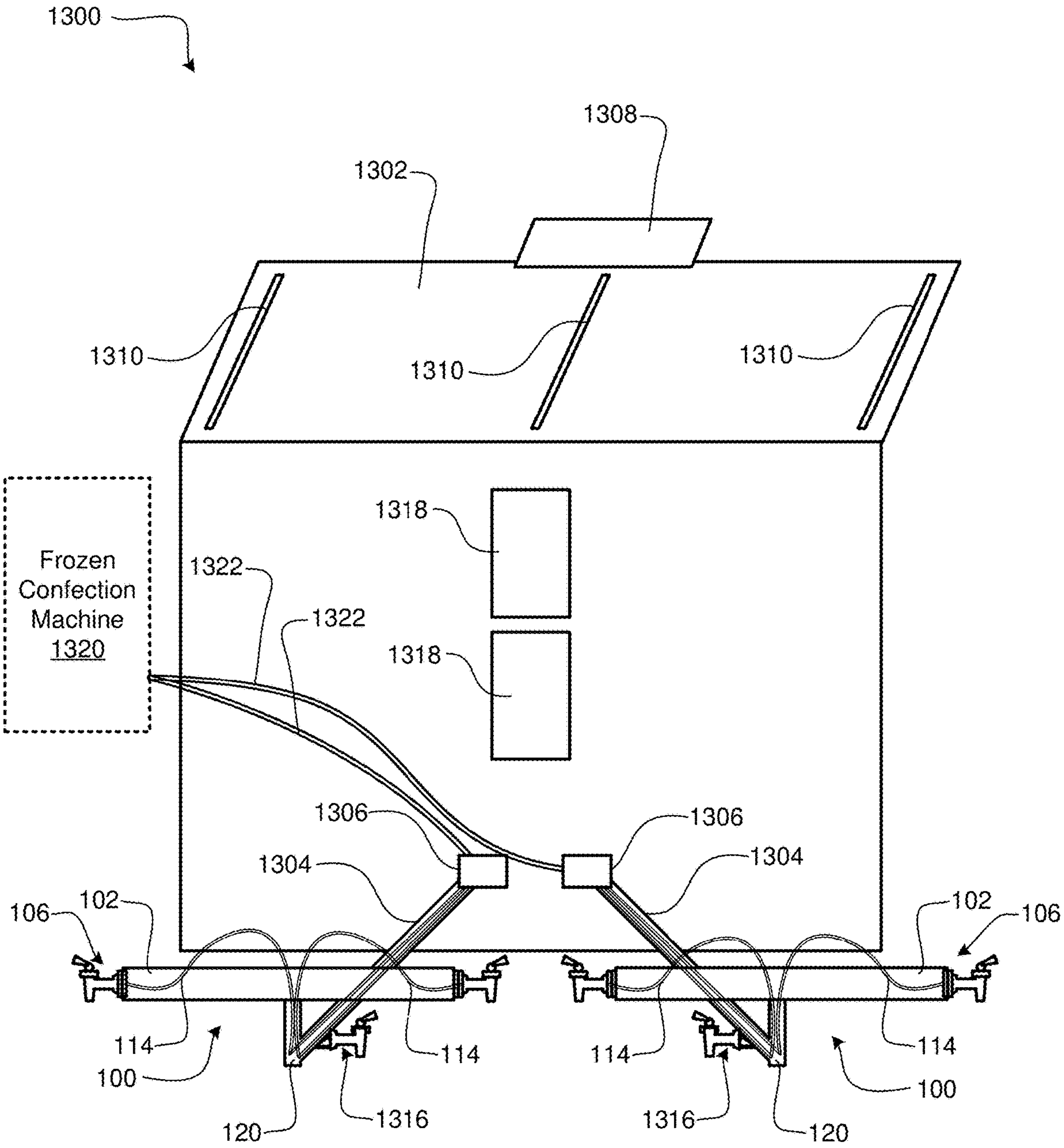
FIG. 13B is a schematic illustration of a side view of a portable preparation assembly, wherein the portable preparation assembly is configured to be disposed within a recess defined within a sidewall of an edifice, and wherein the portable preparation assembly is in the open or dispensing orientation.

FIGS. 13A and 13B are schematic illustrations of an example portable preparation assembly 1300 to be integrated within an edifice (see 504 first discussed in connection with FIG. 5). The assembly 1300 is utilized to provide users within fluid dispensers 100 and other components for preparing a frozen confection such as a snow cone or shaved ice. The assembly 1300 may be integrated into an edifice recess of an edifice, as described herein. FIG. 13A illustrates wherein a door 1302 of the assembly 1300 is opened and lifted up, and the fluid dispensers 100 are lifted up into the stored position to prepare the assembly 1300 for transport. FIG. 13B illustrates wherein the door 1302 of the assembly 1300 is opened and lifted up, and the fluid dispensers 100 are lowered into the dispensing position to prepare the assembly 1300 for dispensing fluids for preparing a frozen confection.

The assembly 1300 includes a door 1302 that may additionally include a handle 1308 or other type of latch. The door 1302 may include a latch, fastener, or locking mechanism. The door 1302 includes a means for ensuring the door remains lifted and opened when the assembly 1300 is in use. This may include, for example, a chain or other fastener attached to a wall of the edifice that may engage with the door 1302 to hold the door in the lifted position, and so forth. The door 1302 may be equipped with hydraulics to maintain the door in the lifted and open position. The door 1302 may be equipped with any suitable means for ensuring the door 1302 remains lifted and open when the assembly 1300 is in use.

The assembly 1300 includes one or more lights 1310 that may be integrated into the door 1302 as shown in FIGS. 13A and 13B. The lights 1310 may include high efficiency lights such as LED lights to ensure the lights 1310 do not utilize substantial amounts of energy when in use.

The assembly 1300 includes one or more fluid dispensers 100 attached to a mounting arm 1304. The mounting arm 1304 could be a horizontally-mounted mounting arm 504 or vertically-mounted mounting arm 904 as described herein. The mounting arms 1304 are attached to a pivot point 1306 that enables the mounting arm to be disposed in a stored position as shown in FIG. 13A or dropped down into a dispensing position as shown in FIG. 13B. The assembly 1300 includes one or more product dispensers 1318, which may specifically include regions for dispensing products such as napkins, wet wipes, cups, spoons, and so forth.

FIG. 13B illustrates a cross-sectional side view of portions of the fluid dispensers 100. The tubes 114 may provide fluid communication between the faucets 106 and one or more reservoirs stored within the edifice (not shown). As shown in FIG. 13B, the tubes 114 may run out of the mounting assembly 102 and then back into the mounting assembly 102 and into the tube chute 120. The tubes 114 may then run through a hollow interior space defined by the mounting arm 1304.

The assembly 1300 may additionally include one or more washing faucets 1316 integrated into the mounting arm 1304 and/or the tube chute 120. The washing faucets 1316 may be opened to dispense water for washing hands after utilizing the faucets 106 is the fluid dispenser. As described herein, melted ice or excess water from a frozen confection machine may be permitted to drip down and run into the mounting arm 1304. This provides the dual purpose of ensuring the flavor syrups within the tubes 114 are maintained at a cooler temperature, and additionally enables users to quickly wash off fingers or hands after dispensing a sticky flavor syrup.

Further as shown in FIG. 13B, a frozen confection machine 1320 may be disposed within or mounted to the edifice (see 502 first illustrated in connection with FIG. 5). The frozen confection machine 1320 is configured to process ice to generate shaved ice for use in connection with a frozen confection, such as a snow cone or shaved ice. The frozen confection machine 1320 includes a drain for draining used liquid, such as melted water or used water. This drain is in fluid communication with a hollow interior space defined by the mounting arm 1304. This enables excess fluid from the frozen confection machine 1320 to flow into the hollow interior space defined by the mounting arm 1304, and out of the mounting arm through the washing faucet 1316. Thus, a user may open the washing faucet 1316 to receive a gravity-fed stream of drainage water from the frozen confection machine 1320. Additionally, the drainage water from the frozen confection machine 1320 may be disposed within the hollow interior space defined by the mounting arm 1304, along with the plurality of tubes 114 of the fluid dispenser 100, such that the cold drainage water prevents the flavor syrups (within the tubes 114) from heating up on a warm day. The system 1300 may include one or more drainage tubes 1322 that provide fluid communication from a drain of the frozen confection machine 1320 to the hollow interior space defined by the mounting arm 1304.

It will be appreciated by those skilled in the art that, while several implementations are described and shown in the exemplary figures herein, one implementation may have any number of features shown. The figures shown herein are intended to be exemplary and non-limiting, and some figures show some features that other figures do not simply for clarity and readability. In other words, it is contemplated that one implementation of the present disclosure may feature each and every feature disclosed, or an implementation may feature a subset combination of the features shown without departing from the scope of the present disclosure.

In various implementations, a stand for holding or otherwise housing reservoirs and tubes, hoses or lines may be located outside of the edifice. The stand may be a metal stand or made from another material and may be configured to fit inside the edifice for transport to a location.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

EXAMPLES

The following examples pertain to further embodiments.

Example 1 is a system. The system comprises a dispenser assembly comprising an upper portion and a lower portion, a mounting arm, and an edifice. The dispenser assembly is configured to be mounted to the arm and the arm is pivotably or rotatably mounted to an edifice.

Example 2 is a system as in Example 1, wherein the upper portion comprises a plurality of channels formed within a sidewall of the upper portion. The lower portion comprises a plurality of buttons that extend radially, wherein the lower portion is configured to couple to the upper portion by inserting the buttons into the channels. The upper portion includes a ridge, and each button includes a ridge that aligns with the ridge of the upper portion to form clamping surfaces that occlude a tubing that passes between the upper portion and the button.

Example 3 is a system as in any of Examples 1-2, wherein each button includes a push tab at an end of the button, the push tab extending beyond the channel when the lower portion is coupled to the upper portion.

Example 4 is a system as in any of Examples 1-3, wherein the tubing comprises a plurality of tubes, wherein each tube passes between one of the buttons and upper portion to thereby occlude the tube, and wherein the ridge of the upper portion is a circular ridge.

Example 5 is a system as in any of Examples 1-4, wherein each button includes a first opening and a second opening positioned outwardly from the first opening.

Example 6 is a system as in any of Examples 1-5, wherein the end of the button is angled upwardly to position the push tab above the first opening and the second opening.

Example 7 is a system as in any of Examples 1-6, wherein each of the lower portion and the upper portion includes a central opening through which the tubing passes.

Example 8 is a system as in any of Examples 1-7, wherein the upper portion is positioned above the lower portion, and wherein after the tubing passes through the central opening, each tube in the tubing passes through the first opening and then through the second opening of a corresponding button.

Example 9 is a system as in any of Examples 1-8, wherein the channels are configured to allow the push tab to be pressed downwardly to cause the corresponding tube to no longer be occluded between the ridge and the circular ridge.

Example 10 is a system as in any of Examples 1-9, wherein the upper portion includes a central opening for enabling the tubing to pass through the upper portion and a plurality of holes disposed within the central opening.

Example 11 is a system as in any of Examples 1-10, wherein the edifice further comprises a recess disposed within a sidewall of the edifice.

Example 12 is a system as in any of Examples 1-11, wherein the arm is disposed within the recess, and the arm is pivotally mounted to the edifice such that the dispenser assembly can change position between a deployed position and a stored position.

Example 13 is a system as in any of Examples 1-12, wherein the arm is fully within the recess in the stored position, and wherein the arm is protruding from the recess in the deployed position.

Example 14 is a system as in any of Examples 1-13, wherein the arm comprises a locking mechanism such that the arm can be locked in a stored position, a deployed position, or a partially deployed position.

Example 15 is a system as in any of Examples 1-14, wherein the system further comprises a panel, wherein the panel is a hatch pivotally attached to a sidewall of the edifice and the hatch is flush with the sidewall.

Example 16 is a system as in any of Examples 1-15, wherein the system further comprises a hatch door, and wherein the panel is a removable panel.

Example 17 is a system as in any of Examples 1-16, wherein the system further comprises one or more deployment mechanisms for operating the hatch door, for operating the arm, or for operating both the hatch door and the arm.

Example 18 is a system as in any of Examples 1-17, wherein the deployment mechanism comprises a lever or a button.

Example 19 is a system as in any of Examples 1-18, wherein the tubing extends from the edifice through the arm to the dispenser assembly.

Example 20 is a system as in any of Examples 1-19, wherein the edifice comprises a plurality of liquid dispensers and a coolant dispenser.

Example 21 is a system as in any of Examples 1-20, wherein the arm comprises a hollow interior and the hollow interior facilitates transfer of the coolant and one or more liquids from the liquid dispensers via the tubing through the arm to the dispenser assembly.

Example 22 is a system as in any of Examples 1-21, wherein the coolant dispenser contains a coolant, and wherein the coolant is a liquid coolant or a gaseous coolant.

Example 23 is a system as in any of Examples 1-22, wherein the arm comprises an insulating material.

Example 24 is a system as in any of Examples 1-23, wherein the system further comprises a second arm and a second dispenser assembly, wherein the second dispenser assembly is mounted to the second arm and the second arm is mounted to the edifice, and both the arm and the second arm may move independently of one another.

Example 25 is a system comprising a mounting arm configured to be mounted to an edifice, wherein the arm is configured to move between an open position and a closed position, a dispenser assembly mounted to the arm, one or more tubes configured to span a length of the arm and terminate at the dispenser assembly, wherein the one or more tubes are configured to transport fluid along the length of the arm to the dispenser assembly.

Example 26 is a system as in Example 25, further comprising one or more reservoirs mounted to the edifice, each comprising a liquid, wherein the one or more reservoirs are in fluid communication with at least one of the one or more tubes; and a chute comprising an opening defined by a sidewall of the chute mounted to the edifice, wherein the chute is positioned relative to the one or more reservoirs and the arm such that the one or more tubes in fluid communication with the one or more reservoirs are fed through the opening of chute and to the arm.

Example 27 is a system as in Examples 25 or 26, wherein the dispenser assembly comprises an upper portion comprising a plurality of channels formed within a sidewall of the upper portion; and a lower portion comprising a plurality of prongs that extend radially from the lower portion; wherein the lower portion is configured to couple to the upper portion by inserting an end of each of the plurality of prongs into a corresponding channel of the plurality of channels of the upper portion; wherein the upper portion includes a plurality of upper ridges and each prong of the plurality of prongs of the lower portion includes a lower ridge that aligns with at least one of the upper ridges of the upper portion to form one or more clamping surfaces that occlude a tube that passes between the upper portion and the lower portion.

Example 28 is a system as in any of Examples 25-27, wherein each of the plurality of prongs of the lower portion comprises a push tab configured to be pressed such that pressing the push tab removes the occlusion of the tube that passes between the upper portion and the lower portion.

Example 29 is a system as in any of Examples 25-28, wherein the arm comprises a mount configured to join the arm to the edifice such that the arm is mounted to the edifice and retains a degree of movement about an axis defined by the mount.

Example 30 is a system as in any of Examples 25-29, wherein the arm further comprises a secondary dispenser in fluid communication with the arm, and wherein the arm is in fluid communication with the chute.

Example 31 is a system as in any of Examples 25-30, wherein the arm further comprises a secondary dispenser in fluid communication with at least one of the one or more tubes and in fluid communication with a secondary reservoir within the edifice.

Example 32 is a system as in any of Examples 25-31, wherein the arm comprises a plurality of arms, wherein each arm comprises a mount whereby each of the plurality of arms is mounted to the edifice, and wherein each arm is mounted to the edifice such that each arm maintains individual freedom of movement.

Example 33 is a system as in any of Examples 25-32, wherein the edifice comprises a recess, and wherein the closed position of the arm is a storage position whereby the arm is moved inside the recess of the edifice and flush with a sidewall of the edifice.

Example 34 is a system as in any of Examples 25-33, wherein the opening position comprises an operation position whereby the arm is moved out of the recess of the edifice such that the dispenser assembly of the arm is not within the recess of the edifice.

Example 35 is a system as in any of Examples 25-34, wherein the edifice comprises a recess door configured to completely cover the recess of the edifice, wherein the recess door is pivotally mounted to the edifice or removably attached to the edifice.

Example 36 is a system as in any of Examples 25-35, further comprising a tableware dispenser, wherein the tableware dispenser is configured to dispense one or more items of tableware.

Example 37 is a system as in any of Examples 25-36, further comprising one or more topping dispensers that are not in fluid communication with the one or more tubes, and configured to dispense one or more of a liquid, solid, or semi-solid topping.

Example 38 is a system as in any of Examples 25-37, further comprising a deployment mechanism, wherein the operating the deployment mechanism causes the arm to move between the open position and the closed position.

Example 39 is a system as in any of Examples 25-38, further comprising a locking mechanism, wherein engaging the locking mechanism prevents the arm from moving between the open position and the closed position, and wherein disengaging the locking mechanism permits the arm to move between the open position and the closed position.

Example 40 is a system as in any of Examples 25-39, wherein the chute is sufficiently large to receive a quantity of ice, such that the ice comes into contact with the one or more tubes and chills the liquid of the one or more fluid reservoirs.

Example 41 is a system as in any of Examples 25-41, further comprising one or more dispensing means configured to control flow of a liquid affixed to a terminal end of one or more of the one or more tubes, and wherein the dispensing means comprises one or more of a nozzle, spout, or faucet.

Example 42 is a system for servicing frozen confections comprising a mobile edifice; a mounting arm configured to be mounted to the mobile edifice, wherein the arm is configured to move between an open position and a closed position; a dispenser assembly mounted to the arm; one or more tubes configured to span a length of the arm and terminate at the dispenser assembly, wherein the one or more tubes are configured to transport fluid along the length of the arm to the dispenser assembly.

Example 43 is a system as in Example 42, further comprising one or more reservoirs mounted to a sidewall of the mobile edifice, each comprising a liquid, wherein the one or more reservoirs are in fluid communication with at least one of the one or more tubes; and a chute comprising an opening defined by a sidewall of the chute mounted to the mobile edifice, wherein the chute is positioned relative to the one or more reservoirs and the arm such that the one or more tubes in fluid communication with the one or more reservoirs are fed through the opening of chute and to the arm.

Example 44 is a system as in Examples 42 or 43, wherein the arm comprises a plurality of arms, wherein each arm comprises a mount whereby each of the plurality of arms is mounted to a sidewall of the mobile edifice, and wherein each arm is mounted to the edifice such that each arm maintains individual freedom of movement.

Example 45 is a system as in any of Examples 42-44, wherein the arm further comprises a secondary dispenser in fluid communication with the arm, wherein the arm is in fluid communication with the chute.

Example 46 is a system as in any of Examples 42-45, wherein the arm further comprises a secondary dispenser in fluid communication with at least one of the one or more tubes and in fluid communication with a secondary reservoir within the mobile edifice.

Example 47 is a system as in any of Examples 42-46, further comprising one or more tertiary dispensers mounted externally on a sidewall of the mobile edifice and not in fluid communication with the one or more tubes, wherein the one or more tertiary dispensers are configured to dispense one or more of tableware or a solid, liquid, or semi-solid topping.

Example 48 is a system as in any of Examples 42-47, wherein the dispenser assembly comprises an upper portion comprising a plurality of channels formed within a sidewall of the upper portion; and a lower portion comprising a plurality of prongs that extend radially from the lower portion; wherein the lower portion is configured to couple to the upper portion by inserting an end of each of the plurality of prongs into a corresponding channel of the plurality of channels of the upper portion; wherein the upper portion includes a plurality of upper ridges and each prong of the plurality of prongs of the lower portion includes a lower ridge that aligns with at least one of the upper ridges of the upper portion to form one or more clamping surfaces that occlude a tube that passes between the upper portion and the lower portion; wherein each of the plurality of prongs of the lower portion comprises a push tab configured to be pressed such that pressing the push tab removes the occlusion of the tube that passes between the upper portion and the lower portion.

Example 49 is a system as in any of Examples 42-48, further comprising one or more dispensing means configured to control flow of a liquid affixed to a terminal end of one or more of the one or more tubes.

Example 50 is a system. The system includes a mounting arm configured to be attached to an edifice. The system includes a fluid dispenser mounted to the mounting arm, wherein the fluid dispenser comprises: a mounting assembly; a plurality of faucets attached to the mounting assembly; and a plurality of tubes, wherein each of the plurality of tubes is in fluid communication with one or more of the plurality of faucets. The system is such that each of the plurality of tubes is disposed within a hollow interior space defined by the mounting arm. The system is such that each of the plurality of tubes is configured to provide fluid communication between the one or more of the plurality of faucets and a reservoir disposed within or mounted to the edifice.

Example 51 is a system as in Example 50, further comprising the edifice, wherein the edifice comprises a vehicle.

Example 52 is a system as in any of Examples 50-51, further comprising a plurality of reservoirs disposed within or mounted to the edifice, wherein each of the plurality of tubes provides fluid communication between one of the plurality of faucets and one of the plurality of reservoirs.

Example 53 is a system as in any of Examples 50-52, further comprising a fastener configured to attach the mounting arm to a sidewall of the edifice, wherein the fastener enables the mounting arm to pivot about an axis defined by the fastener.

Example 54 is a system as in any of Examples 50-53, wherein the edifice further comprises a recess disposed within a sidewall of the edifice; wherein a longitudinal axis of the mounting arm is configured to be substantially parallel to the sidewall of the edifice when the mounting arm is in a closed position and disposed within the recess; and wherein the longitudinal axis of the mounting arm is configured to be substantially perpendicular to the sidewall of the edifice when the mounting arm is in an open position.

Example 55 is a system as in any of Examples 50-54, further comprising a product dispenser disposed within the recess of the edifice, wherein the product dispenser is configured to dispense one or more of napkins, wet wipes, flatware, or tableware.

Example 56 is a system as in any of Examples 50-55, further comprising one or more reservoirs disposed within or mounted to the edifice, and wherein the reservoirs are configured to store a flavored topping for use in connection with a frozen confection.

Example 57 is a system as in any of Examples 50-56, further comprising one or more reservoirs disposed within or mounted to the edifice, and wherein a vertical position of the one or more reservoirs is higher than a vertical position of the fluid dispenser such that a fluid disposed within the one or more reservoirs is gravity fed through the fluid dispenser and out through one or more of the plurality of faucets.

Example 58 is a system as in any of Examples 50-57, wherein the edifice further comprises: a sidewall; a recess disposed within the sidewall of the edifice, wherein the recess is sufficiently deep such that the fluid dispenser fits within the recess when the mounting arm is oriented in a stored position; and a door attached to the sidewall, wherein the hinged door is opened to reveal the fluid dispenser disposed within the recess.

Example 59 is a system as in any of Examples 50-58, wherein the door is attached to the sidewall by way of a hinge.

Example 60 is a system as in any of Examples 50-59, further comprising a light attached to the door.

Example 61 is a system as in any of Examples 50-60, wherein the hollow interior space of the mounting arm is sufficiently large to receive each of the plurality of tubes and to further receive a washing fluid.

Example 62 is a system as in any of Examples 50-61, wherein the washing fluid is water drained from a frozen confection machine, and wherein the frozen confection machine is configured to shave ice.

Example 63 is a system as in any of Examples 50-62, wherein the hollow interior space defined by the mounting arm is in fluid communication with a drain of the frozen confection machine.

Example 64 is a system as in any of Examples 50-63, wherein the mounting arm further comprises a washing faucet attached to a sidewall of the mounting arm; and wherein the washing faucet is opened to enable the washing fluid to drain from the mounting arm.

Example 65 is a system as in any of Examples 50-64, wherein the mounting assembly of the fluid dispenser comprises: an upper wall; a lower wall oriented substantially parallel to the upper wall; and a sidewall defining a perimeter of the mounting assembly, wherein the sidewall is substantially parallel to the upper wall and the lower wall, and wherein the sidewall is disposed in between the upper wall and the lower wall; wherein the plurality of faucets is attached to the mounting assembly at the sidewall of the mounting assembly.

Example 66 is a system as in any of Examples 50-65, wherein each of the plurality of tubes is at least partially disposed within an interior space defined by the upper wall, the lower wall, and the sidewall of the mounting assembly of the fluid dispenser.

Example 67 is a system as in any of Examples 50-66, wherein the upper wall comprises a tube hole disposed through the upper wall; wherein at least one of the plurality of tubes is disposed through the tube hole to exit the interior space defined by the upper wall, the lower wall, and the sidewall of the mounting assembly of the fluid dispenser.

Example 68 is a system as in any of Examples 50-67, wherein the mounting assembly further comprises a central hole disposed through each of the upper wall and the lower wall; wherein the system further comprises a tube chute, wherein the tube chute is disposed within the central hole, and wherein a longitudinal axis of the tube chute is substantially perpendicular to a plane defined by the upper wall and the lower wall.

Example 69 is a system as in any of Examples 50-68, wherein the tube chute is attached to the mounting arm, and wherein each of the plurality of tubes is disposed within an interior space defined by the tube chut and is further disposed within the hollow interior space defined by the mounting arm.

Example 70 is a system as in any of Examples 50-69, wherein the system additionally or alternatively includes any of the components described in connection with Examples 1-49.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A system comprising:

a mounting arm configured to be attached to a sidewall defining a recess of an edifice and moved relative to the edifice; and a fluid dispenser mounted to the mounting arm, wherein the fluid dispenser comprises:

a mounting assembly;

a plurality of faucets attached to the mounting assembly; and a plurality of tubes, wherein each of the plurality of tubes is in fluid communication with one or more of the plurality of faucets;

wherein each of the plurality of tubes is enclosed and disposed within a hollow interior space defined by the mounting arm; and wherein each of the plurality of tubes is configured to provide fluid communication between the one or more of the plurality of faucets and a reservoir disposed within or mounted to the edifice.

2. The system of claim 1, further comprising the edifice, wherein the edifice comprises a vehicle.

3. The system of claim 2, further comprising a plurality of reservoirs disposed within or mounted to the edifice, wherein each of the plurality of tubes provides fluid communication between one of the plurality of faucets and one of the plurality of reservoirs.

4. The system of claim 2, further comprising a fastener configured to attach the mounting arm to the sidewall of the edifice, wherein the fastener enables the mounting arm to pivot about an axis defined by the fastener.

5. The system of claim 2, wherein a longitudinal axis of the mounting arm is configured to be parallel to the sidewall of the edifice when the mounting arm is in a closed position and disposed within the recess; and wherein the longitudinal axis of the mounting arm is configured to be perpendicular to the sidewall of the edifice when the mounting arm is in an open position.

6. The system of claim 5, further comprising a product dispenser disposed within the recess of the edifice, wherein the product dispenser is configured to dispense one or more of napkins, wet wipes, flatware, or tableware.

7. The system of claim 2, further comprising one or more reservoirs disposed within or mounted to the edifice, and wherein the one or more reservoirs are configured to store a flavored topping for use in connection with a frozen confection.

8. The system of claim 2, further comprising one or more reservoirs disposed within or mounted to the edifice, and wherein a vertical position of the one or more reservoirs is higher than a vertical position of the fluid dispenser such that a fluid disposed within the one or more reservoirs is gravity fed through the fluid dispenser and out through one or more of the plurality of faucets.

9. The system of claim 2, wherein the edifice further comprises:

a door attached to the sidewall, wherein the hinged door is opened to reveal the fluid dispenser disposed within the recess;

wherein the recess is sufficiently deep such that the fluid dispenser fits within the recess when the mounting arm is oriented in a stored position.

10. The system of claim 9, further comprising a light attached to the door and wherein the door is attached to the sidewall by way of a hinge.

11. The system of claim 1, wherein the hollow interior space of the mounting arm is sufficiently large to receive each of the plurality of tubes and to further receive a washing fluid.

12. The system of claim 11, wherein the washing fluid is water drained from a frozen confection machine, and wherein the frozen confection machine is configured to shave ice.

13. The system of claim 12, wherein the hollow interior space defined by the mounting arm is in fluid communication with a drain of the frozen confection machine.

14. The system of claim 13, wherein the mounting arm further comprises a washing faucet attached to a sidewall of the mounting arm; and wherein the washing faucet is opened to enable the washing fluid to drain from the mounting arm.

15. The system of claim 1, wherein the mounting assembly of the fluid dispenser comprises:

an upper wall;

a lower wall oriented parallel to the upper wall; and a sidewall defining a perimeter of the mounting assembly, wherein the sidewall is parallel to the upper wall and the lower wall, and wherein the sidewall is disposed in between the upper wall and the lower wall;

wherein the plurality of faucets is attached to the mounting assembly at the sidewall of the mounting assembly.

16. The system of claim 15, wherein each of the plurality of tubes is at least partially disposed within an interior space defined by the upper wall, the lower wall, and the sidewall of the mounting assembly of the fluid dispenser.

17. The system of claim 16, wherein the upper wall comprises a tube hole disposed through the upper wall;

wherein at least one of the plurality of tubes is disposed through the tube hole to exit the interior space defined by the upper wall, the lower wall, and the sidewall of the mounting assembly of the fluid dispenser.

18. The system of claim 17, wherein the mounting assembly further comprises a central hole disposed through each of the upper wall and the lower wall;

wherein the system further comprises a tube chute, wherein the tube chute is disposed within the central hole, and wherein a longitudinal axis of the tube chute is perpendicular to a plane defined by the upper wall and the lower wall.

19. The system of claim 18, wherein the tube chute is attached to the mounting arm, and wherein each of the plurality of tubes is disposed within an interior space defined by the tube chut and is further disposed within the hollow interior space defined by the mounting arm.

20. A system comprising:

a mounting arm configured to be attached to an edifice, wherein the edifice comprises a recess disposed within a sidewall of the edifice; and a fluid dispenser mounted to the mounting arm, wherein the fluid dispenser comprises:

a mounting assembly;

a plurality of faucets attached to the mounting assembly; and a plurality of tubes, wherein each of the plurality of tubes is in fluid communication with one or more of the plurality of faucets;

wherein each of the plurality of tubes is enclosed and disposed within a hollow interior space defined by the mounting arm;

wherein each of the plurality of tubes is configured to provide fluid communication between the one or more of the plurality of faucets and a reservoir disposed within or mounted to the edifice;

wherein the mounting arm is disposed within the recess of the edifice when in a closed position; and wherein the mounting arm extends away from the recess of the edifice when in an open position.

* * * * *